United States Patent
Marzban et al.

(10) Patent No.: US 12,432,587 B2
(45) Date of Patent: Sep. 30, 2025

(54) SLOT LEVEL OVERBOOKING FOR MULTI-SLOT PHYSICAL DOWNLINK CONTROL CHANNEL MONITORING

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Jing Sun, San Diego, CA (US); Tao Luo, San Diego, CA (US); Xiaoxia Zhang, San Diego, CA (US); Qingjiang Tian, San Diego, CA (US); Ahmed Abdelaziz Ibrahim Abdelaziz Zewail, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 515 days.

(21) Appl. No.: 17/810,958

(22) Filed: Jul. 6, 2022

(65) Prior Publication Data

US 2023/0096925 A1 Mar. 30, 2023

Related U.S. Application Data

(60) Provisional application No. 63/261,917, filed on Sep. 30, 2021.

(51) Int. Cl.
*H04W 24/08* (2009.01)
*H04W 72/0446* (2023.01)
*H04W 72/23* (2023.01)

(52) U.S. Cl.
CPC ....... *H04W 24/08* (2013.01); *H04W 72/0446* (2013.01); *H04W 72/23* (2023.01)

(58) Field of Classification Search
CPC ............... H04L 5/0053; H04L 27/2602; H04L 27/26025; H04L 5/0094; H04W 72/0457; H04W 72/231; H04W 72/0446; H04W 48/12; H04W 72/232
See application file for complete search history.

(56) References Cited

U.S. PATENT DOCUMENTS

| | | | | |
|---|---|---|---|---|
| 2019/0313321 | A1* | 10/2019 | Xu | H04L 5/0053 |
| 2020/0413412 | A1* | 12/2020 | Kim | H04W 24/08 |
| 2023/0371043 | A1* | 11/2023 | Pan | H04W 72/232 |
| 2024/0064760 | A1* | 2/2024 | Sun | H04L 5/0023 |

FOREIGN PATENT DOCUMENTS

WO WO-2022216603 A1 * 10/2022 ......... H04L 27/2602

* cited by examiner

*Primary Examiner* — Mahran Y Abu Roumi
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration associated with a plurality of search spaces, wherein the plurality of search spaces are distributed across a plurality of slots. The UE may drop all search spaces of an identified slot based at least in part on one or more overbooking conditions. The UE may monitor a remainder of the plurality of search spaces other than the dropped search spaces. Numerous other aspects are described.

30 Claims, 16 Drawing Sheets

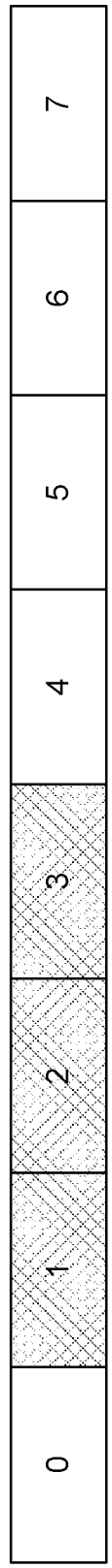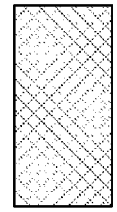
FIG. 5

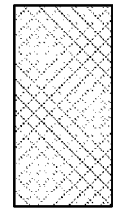 Slot with no SS configured
 Slot with CSS configured
Slot with only USS configured
FIG. 7

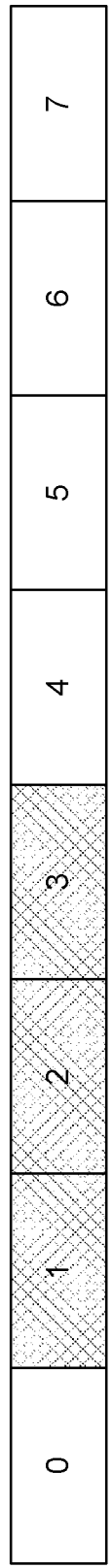
FIG. 8

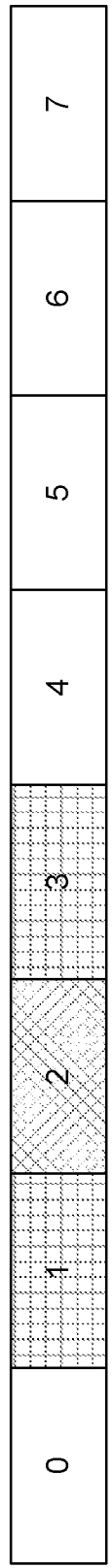
X = 8 slots; Y = 2 slots
☐ Slot with no SS configured
 Slot with CSS configured
 Slot with only USS configured
FIG. 9

X = 8 slots; Y = 4 slots

Slot with no SS configured
Slot with CSS configured
Slot with only USS configured

SLOT LEVEL OVERBOOKING FOR MULTI-SLOT PHYSICAL DOWNLINK CONTROL CHANNEL MONITORING

CROSS-REFERENCE TO RELATED APPLICATION

This patent application claims priority to U.S. Provisional Patent Application No. 63/261,917, filed on Sep. 30, 2021, entitled "SLOT-LEVEL OVERBOOKING FOR MULTI-SLOT PDCCH MONITORING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for slot level overbooking for multi-slot physical downlink control channel monitoring.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration associated with a plurality of search spaces, wherein the plurality of search spaces are distributed across a plurality of slots. The method may include dropping all search spaces of an identified slot based at least in part on one or more overbooking conditions. The method may include monitoring a remainder of the plurality of search spaces other than the dropped search spaces.

Some aspects described herein relate to a method of wireless communication performed by a network node. The method may include transmitting a configuration associated with a plurality of search spaces, wherein the plurality of search spaces are distributed across a plurality of slots. The method may include dropping all search spaces of an identified slot based at least in part on one or more overbooking conditions. The method may include transmitting on a remainder of the plurality of search spaces other than the dropped search spaces.

Some aspects described herein relate to an apparatus for wireless communication performed by a UE. The apparatus may include a memory and one or more processors, coupled to the memory. The one or more processors may be configured to receive a configuration associated with a plurality of search spaces, wherein the plurality of search spaces are distributed across a plurality of slots. The one or more processors may be configured to drop all search spaces of an identified slot based at least in part on one or more overbooking conditions. The one or more processors may be configured to monitor a remainder of the plurality of search spaces other than the dropped search spaces.

Some aspects described herein relate to an apparatus for wireless communication performed by a network node. The apparatus may include a memory and one or more processors, coupled to the memory. The one or more processors may be configured to transmit a configuration associated with a plurality of search spaces, wherein the plurality of search spaces are distributed across a plurality of slots. The one or more processors may be configured to drop all search spaces of an identified slot based at least in part on one or more overbooking conditions. The one or more processors may be configured to transmit on a remainder of the plurality of search spaces other than the dropped search spaces.

Some aspects described herein relate to a non-transitory computer-readable medium that stores a set of instructions for wireless communication by a UE. The set of instructions, when executed by one or more processors of the UE, may cause the UE to receive a configuration associated with a plurality of search spaces, wherein the plurality of search spaces are distributed across a plurality of slots. The set of instructions, when executed by one or more processors of the UE, may cause the UE to drop all search spaces of an identified slot based at least in part on one or more overbooking conditions. The set of instructions, when executed by one or more processors of the UE, may cause the UE to monitor a remainder of the plurality of search spaces other than the dropped search spaces.

Some aspects described herein relate to a non-transitory computer-readable medium that stores a set of instructions for wireless communication by a network node. The set of instructions, when executed by one or more processors of the network node, may cause the network node to transmit a configuration associated with a plurality of search spaces, wherein the plurality of search spaces are distributed across a plurality of slots. The set of instructions, when executed by one or more processors of the network node, may cause the network node to drop all search spaces of an identified slot based at least in part on one or more overbooking conditions. The set of instructions, when executed by one or more processors of the network node, may cause the network node to transmit on a remainder of the plurality of search spaces other than the dropped search spaces.

Some aspects described herein relate to an apparatus for wireless communication. The apparatus may include means for receiving a configuration associated with a plurality of search spaces, wherein the plurality of search spaces are distributed across a plurality of slots. The apparatus may include means for dropping all search spaces of an identified slot based at least in part on one or more overbooking conditions. The apparatus may include means for monitoring a remainder of the plurality of search spaces other than the dropped search spaces.

Some aspects described herein relate to an apparatus for wireless communication. The apparatus may include means for transmitting a configuration associated with a plurality of search spaces, wherein the plurality of search spaces are distributed across a plurality of slots. The apparatus may include means for dropping all search spaces of an identified slot based at least in part on one or more overbooking conditions. The apparatus may include means for transmitting on a remainder of the plurality of search spaces other than the dropped search spaces.

Aspects generally include a method, apparatus, system, computer program product, non-transitory computer-readable medium, user equipment, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of overbooking associated with PDCCH monitoring, in accordance with the present disclosure.

FIG. 7 is a diagram illustrating a first example associated with dropping all search spaces of a slot in accordance with an overbooking condition, in accordance with the present disclosure.

FIG. 8 is a diagram illustrating a second example associated with dropping all search spaces of a slot in accordance with an overbooking condition, in accordance with the present disclosure.

FIG. 9 is a diagram illustrating a third example associated with dropping all search spaces of a slot in accordance with an overbooking condition, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
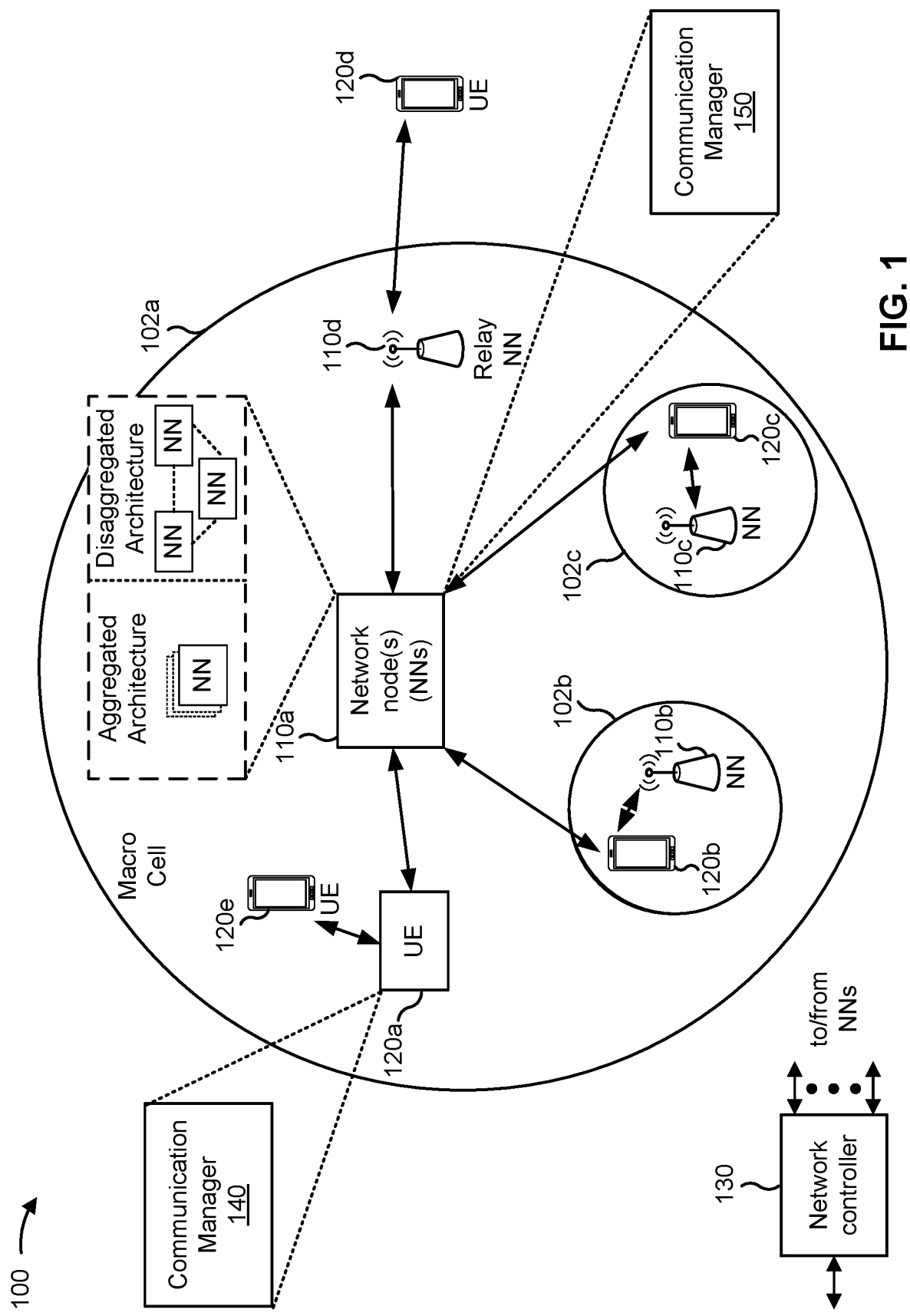
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration associated with a plurality of search spaces, wherein the plurality of search spaces are distributed across a plurality of slots; drop all search spaces of an identified slot based at least in part on one or more overbooking conditions; and monitor a remainder of the plurality of search spaces other than the dropped search spaces. Additionally, or alternatively, the communication manager 140 may perform one or more other operations described herein.

In some aspects, the network node 110 may include a communication manager 150. As described in more detail elsewhere herein, the communication manager 150 may transmit a configuration associated with a plurality of search spaces, wherein the plurality of search spaces are distributed across a plurality of slots; drop all search spaces of an identified slot based at least in part on one or more overbooking conditions; and transmit on a remainder of the plurality of search spaces other than the dropped search spaces. Additionally, or alternatively, the communication manager 150 may perform one or more other operations described herein.

As indicated above, FIG. 1 is provided as an example. Other examples may differ from what is described with regard to FIG. 1.

Figure 2:
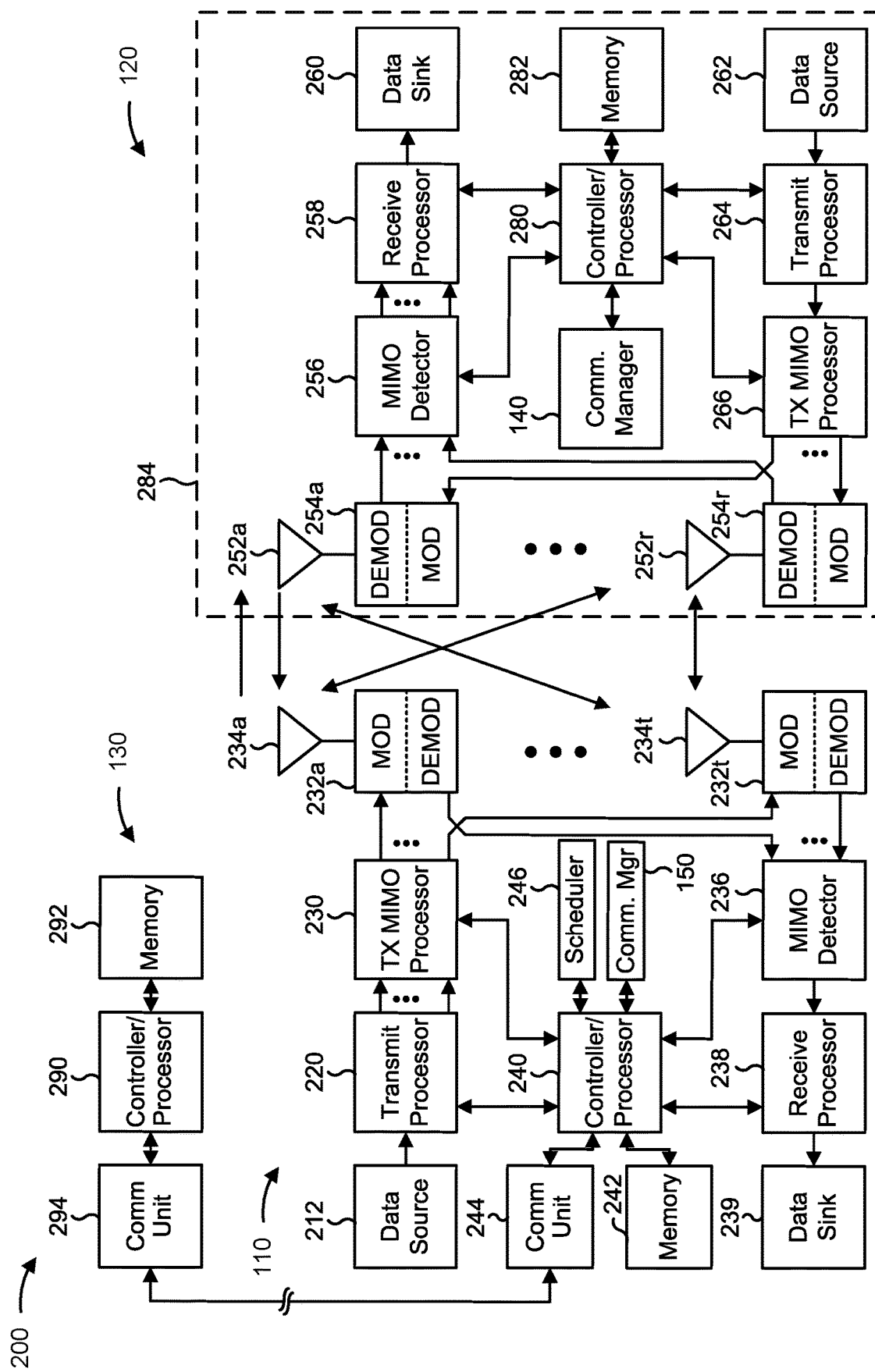
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-15).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-15).

The controller/processor 240 of the network node 110, the controller/processor 280 of the UE 120, and/or any other component(s) of FIG. 2 may perform one or more techniques associated with slot level overbooking for multi-slot physical downlink control channel monitoring, as described in more detail elsewhere herein. For example, the controller/processor 240 of the network node 110, the controller/processor 280 of the UE 120, and/or any other component(s) of FIG. 2 may perform or direct operations of, for example, process 1200 of FIG. 12, process 1300 of FIG. 13, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, the user UE 120 includes means for receiving a configuration associated with a plurality of search spaces, wherein the plurality of search spaces are distributed across a plurality of slots; means for dropping all search spaces of an identified slot based at least in part on one or more overbooking conditions; and/or means for monitoring a remainder of the plurality of search spaces other than the dropped search spaces. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting a configuration associated with a plurality of search spaces, wherein the plurality of search spaces are distributed across a plurality of slots; means for dropping all search spaces of an identified slot based at least in part on one or more overbooking conditions; and/or means for transmitting on a remainder of the plurality of search spaces other than the dropped search spaces. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
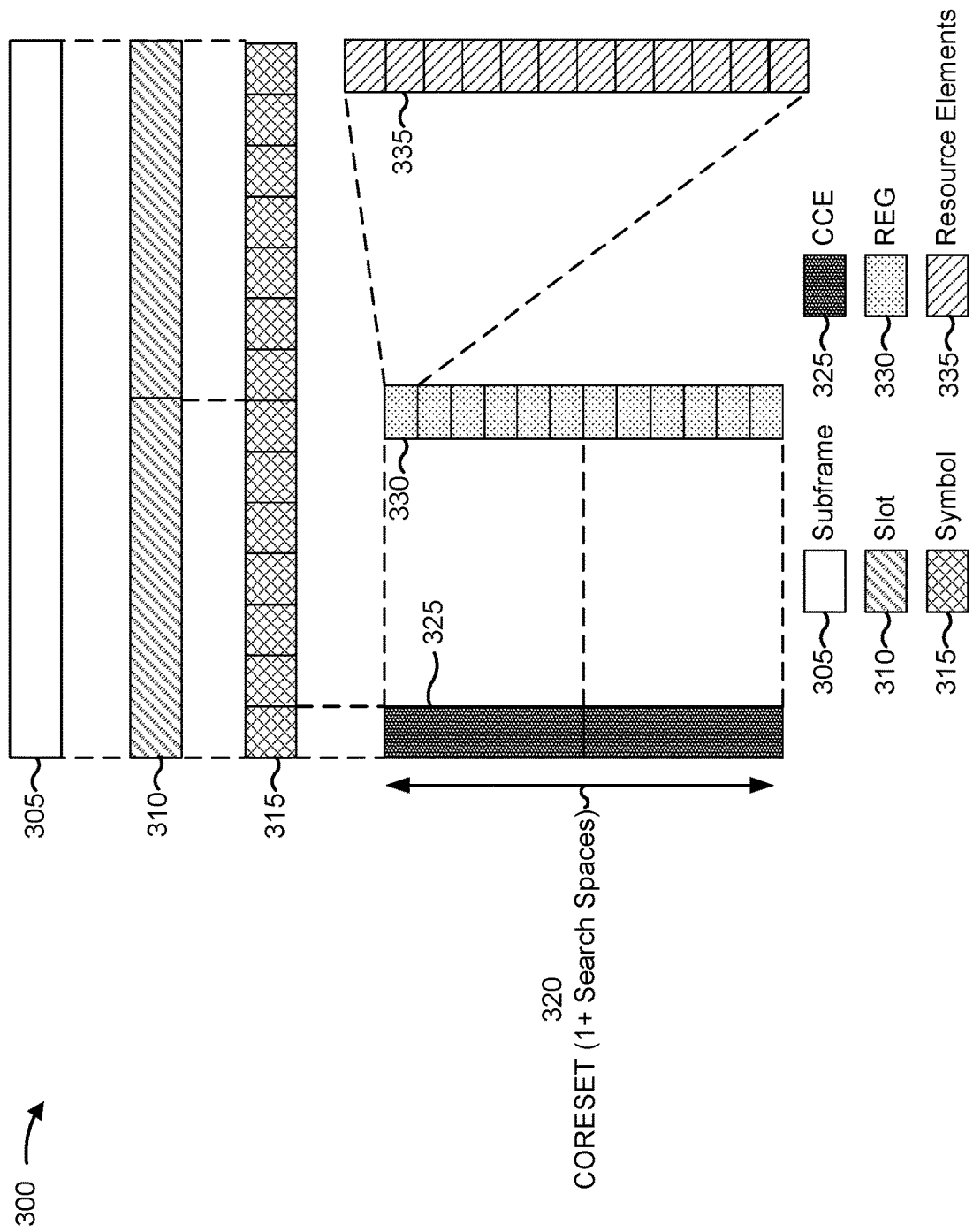
FIG. 3 is a diagram illustrating an example of a resource structure for wireless communication, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, or another quantity of slots). In some aspects, different types of transmission time intervals (TTIs) may be used, other than subframes and/or slots. A slot 310 may include multiple symbols 315, such as 14 symbols per slot.

The potential control region of a slot 310 may be referred to as a CORESET 320 and may be structured to support an efficient use of resources, such as by flexible configuration or reconfiguration of resources of the CORESET 320 for one or more physical downlink control channels (PDCCHs) and/or one or more physical downlink shared channels (PDSCHs). In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A network node may transmit DCI during multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some aspects, different aggregation levels may be used, such as 1, 2, 4, 8, 16, or another aggregation level.

Each CCE 325 may include a fixed quantity of resource element groups (REGs) 330, shown as 6 REGs 330, or may include a variable quantity of REGs 330. In some aspects, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A downlink channel may include a PDCCH that carries DCI, a PDSCH that carries downlink data, or a physical broadcast channel (PBCH) that carries system information, among other examples. In some aspects, PDSCH communications may be scheduled by PDCCH communications. A search space may include all possible locations (e.g., in time and/or frequency) where a PDCCH may be located.

A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs) and/or an aggregation level being used. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space (SS) set.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORESET 320). A non-interleaved CORESET 320 may have a CCE-to-REG mapping such that all CCEs are mapped to consecutive REG bundles (e.g., in the frequency domain) of the CORESET 320.

An uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As described further herein, a UE, such as the UE 120, and/or a network node, such as the network node 110, may be configured to drop search spaces at the slot-level (e.g., all search spaces of an identified slot) in accordance with one or more overbooking conditions.

As indicated above, FIG. 3 is provided as an example. Other examples may differ from what is described with respect to FIG. 3.

Figure 4:
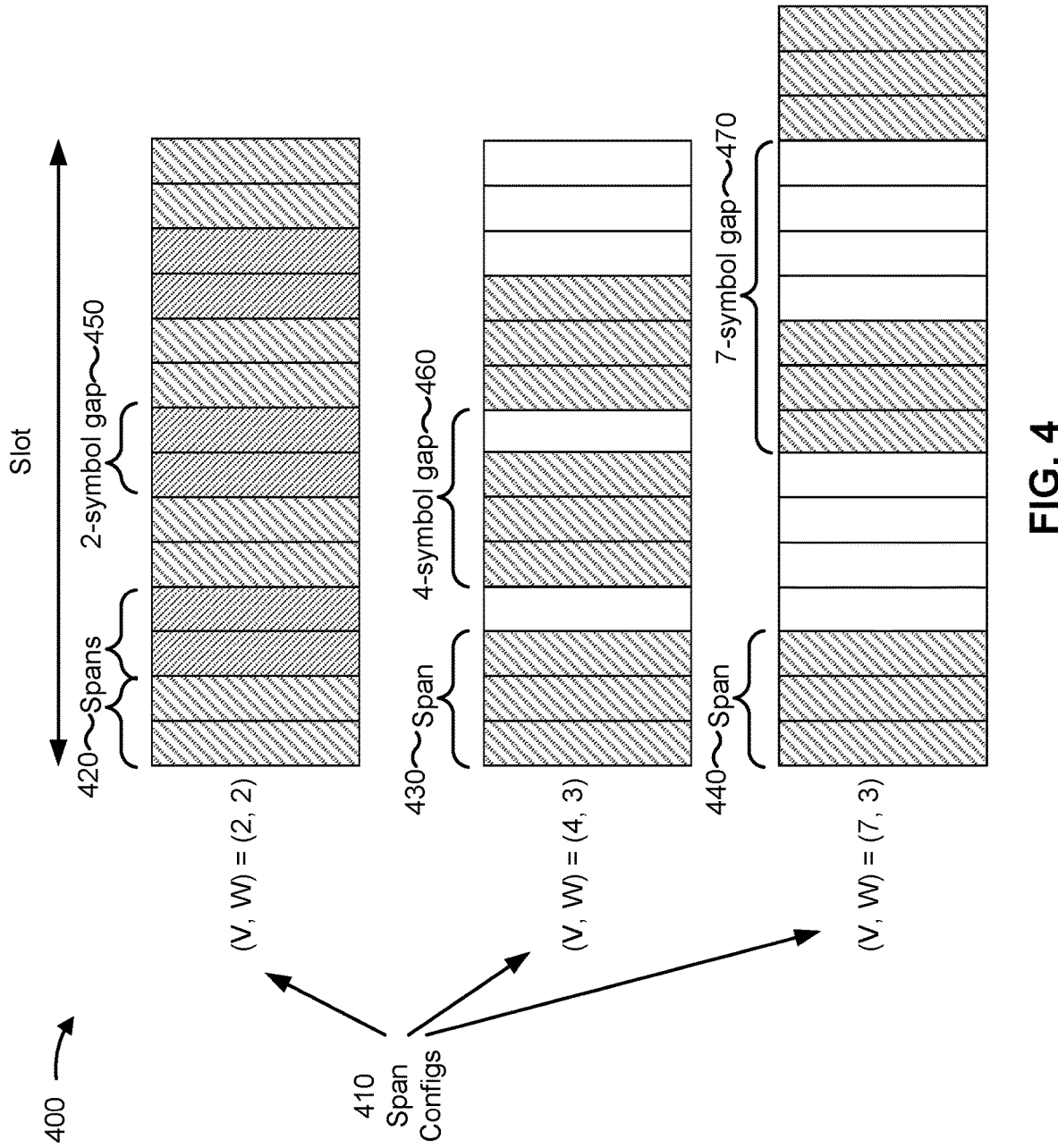
FIG. 4 is a diagram illustrating an example of spans in a slot for physical downlink control channel (PDCCH) monitoring, in accordance with the present disclosure.

FIG. 4 is a diagram illustrating an example 400 of spans in a slot for PDCCH monitoring, in accordance with various aspects of the present disclosure.

In some RATs, such as 3GPP Release 15 of 5G/NR, different PDCCH monitoring capabilities are defined. As an example, a first feature group, which may be mandatory for Release 15 UEs to support, may indicate that the UE is capable of monitoring all PDCCH candidates, for scheduling data, that are within the first few symbols of a slot. As another example, a second feature group, which may be optional for Release 15 UEs to support, may be defined based at least in part on a span concept. A span is a number of consecutive symbols in a slot where the UE is configured to monitor the PDCCH. Each PDCCH monitoring occasion is within one span. A slot may include multiple spans, and a span may include one or more PDCCH candidates. Different span configurations may be supported.

In a 5G/NR network, a network node may transmit a PDCCH communication (e.g., including control information, such as DCI) based at least in part on a search space set. A given search space set defines candidates that may carry a PDCCH communication within the search space set, where each candidate is associated with one or more CCEs. "Candidate" is used interchangeably herein with "PDCCH candidate." A CCE may be composed of multiple REGs. A REG may include one resource block and one OFDM symbol. One or more search space sets may be associated with a control resource set (CORESET). In a 5G/NR network, a network node may flexibly schedule and transmit a PDCCH communication. In other words, transmission of a PDCCH communication in the 5G/NR network is not limited to a particular set of frequency resources and/or time resources in a given radio frame, as in the case of, for example, an LTE network. PDCCH frequency domain and time domain resources are configured on a per CORESET basis. Thus, once a UE is configured with a CORESET, the UE has information that identifies which resource blocks in the frequency domain are assigned to a search space set associated with the CORESET, as well as information that identifies a number of consecutive symbols occupied by the search space set.

In order to receive a PDCCH communication associated with one or more candidates of a given UE-specific search space set (i.e., a search space set that may carry control information specific to one or more particular UEs), a UE may attempt to decode a PDCCH communication in candidates of the search space set. For example, the UE may determine one or more CCE indices associated with a candidate, and may attempt to decode the PDCCH communication (e.g., using a blind decoding procedure). A UE may signal, to the network node, a capability indicating how many non-overlapping CCEs and blind decodes (BDs) the UE is capable of handling. In some cases (e.g., 3GPP Release 15 of 5G/NR), limits on the number of non-overlapping CCEs and BDs are defined on a per-slot basis. Thus, a large number of CCEs/BDs (in the extreme case, all of them) may be configured within one span. This increases the UE complexity, particularly when attempting to conform to processing timelines that are suitable for supporting ultra-reliable low latency communication (URLLC) applications. On the other hand, if the scheduler chooses to distribute the CCEs/BDs across different spans, the number of CCE/BDs per span may not be sufficient for efficient UE communication. For example, for a subcarrier spacing (SCS) of 30 kilohertz (kHz) and a span capability of (V,W)=(2,2) (described in more detail below), each span can have 8 CCEs. Hence, only one candidate of aggregation level=8 can be supported.

To address the above issues, 3GPP Release 16 of 5G/NR introduced a PDCCH monitoring capability that is based at least in part on a span configuration of the UE (as described further below). To improve scheduling flexibility, the number of non-overlapping CCEs and BDs per slot are increased as compared to 3GPP Release 15 of 5G/NR. Furthermore, to relax the UE complexity, a per-span CCE/BD limit (also referred to as a per-span capability) may be specified. This PDCCH monitoring capability may be referred to herein as a span-based monitoring capability or a Release 16 monitoring capability, whereas the PDCCH monitoring capability defined on a per-slot basis may be referred to as a slot-based monitoring capability or a Release 15 monitoring capability. In other words, slot-based monitoring is monitoring for which CCE/BD limits are defined per slot, whereas span-based monitoring is monitoring for which CCE/BD limits are defined per span.

In some cases, channel bandwidth may be wide, and therefore, subcarrier spacing may be increased (e.g., to 960 KHz or 480 KHz) and individual slots may be smaller (e.g., 1/64 ms for a 960 kHz subcarrier spacing or 1/32 ms for a 480 kHz subcarrier spacing). For such short slots, the per-slot PDCCH monitoring capability of a UE may decrease to a certain level such that only a few BDs and a few CCEs are available per slot. Furthermore, when the UE is monitoring the PDCCH, if no valid grants are detected, the UE may enter a "micro-sleep" mode for power saving. The micro-sleep may only be effective if the separation between two PDCCH monitoring occasions is large enough. Given the smaller slot length and the high SCS, the separation between slots may be small, and therefore, the chance of the UE entering a micro-sleep may be low. As a result, power consumption may increase, and a battery life of the UE may decrease. Some radio access technologies may support multi-slot PDCCH monitoring, which is a capability that enables the UE to monitor the PDCCH once every few slots, instead of per slot. Thus, more BDs/CCEs can be included per monitoring occasion, and more micro-sleep gain can be achieved.

In some cases, the multi-slot PDCCH monitoring capability of the UE may be enabled in different configurations. For example, in a first configuration, the separation between two bands may be fixed to X slots. This may allow for simpler BD/CCE budget management (e.g., overbooking and dropping), but may limit a flexibility of the PDCCH monitoring capabilities of the UE. In a second configuration, the separation between the two bands may be flexible (but needs to be at least X slots). This may enable higher flexibility in the PDCCH monitoring capabilities of the UE, but may result in more complicated BD/CCE budget management.

FIG. 4 shows a set of slots that are associated with respective span configurations, shown by reference number 410. A span configuration may identify a minimum offset V between the starting symbols of two respective spans and a maximum span duration W. If a UE monitors a PDCCH on a cell according to combination (V, W), the UE supports PDCCH monitoring occasions in any symbol of a slot with minimum offset of V symbols between the initial symbols of two consecutive spans, including across slots (e.g., the initial symbol of the later-occurring span must be at least V symbols after the initial symbol of the earlier-occurring span). A span starts at an initial symbol where a PDCCH monitoring occasion starts, and the span ends at a last symbol where a PDCCH monitoring occasion ends, where the number of symbols of the span is less than or equal to W.

The spans corresponding to span configurations (2, 2), (4, 3), and (7, 3) are shown by reference numbers 420, 430, and 440, respectively. The spans shown by reference number 420 are shown using alternating diagonal hatching, since these spans are adjacent to each other and would be difficult to differentiate otherwise. The spans shown by reference numbers 430 and 440 are separated by symbols that are not included in a span, which are shown by white rectangles.

The minimum offset V is shown for span configurations (2, 2), (4, 3), and (7, 3) by reference numbers 450, 460, and 470, respectively. It should be noted that V defines a minimum offset, so starting symbols of a pair of spans associated with span configuration (2, 2) may be two or more symbols apart from each other. Furthermore, the maximum span duration W defines a maximum span duration, so the span 430 may have one-symbol or two-symbol spans while still being within the definition of the span configuration (4, 3).

A span configuration may be associated with a per-span capability for a number of BDs and/or a number of non-overlapped CCEs in a span. A per-span capability for a number of BDs may identify a maximum number of BDs that can be configured in a span shown by reference numbers 420/430/440, and a per-span capability for a number of non-overlapped CCEs may identify a maximum number of non-overlapped CCEs that can be configured in a span shown by reference numbers 420/430/440. These per-span capabilities may also be referred to as a BD limit and a CCE limit, respectively.

A UE may report a capability regarding one or more span configurations supported by the UE. For example, the UE may report that the UE supports one or more of span configurations (2, 2), (4, 3), and (7, 3). The UE may determine which span configuration is to be used for a communication based at least in part on a search space configuration. For example, a search space configuration may indicate search space candidates, and the UE may identify a span configuration that aligns with the search space candidates. In the case that the search space configuration aligns with two or more span configurations, the UE may use a largest CCE limit and/or a BD limit of the CCE limits and/or BD limits associated with the two or more span configurations.

As indicated above, FIG. 4 is provided as an example. Other examples may differ from what is described with respect to FIG. 4.

FIG. 5 shows an example 500 of overbooking associated with PDCCH monitoring, in accordance with various aspects of the present disclosure.

In some cases, a network node, such as the network node 110, may transmit, and a UE, such as the UE 120, may receive, an indication of a PDCCH configuration. The PDCCH configuration may be associated with, or may be based at least in part on, a PDCCH BD limit or a PDCCH CCE limit. In some cases, the PDCCH configuration may configure a quantity of PDCCH candidates for the UE 120 that results in a quantity of blind decodes or a quantity of control channel elements for the UE 120 that exceed or are not supported by the PDCCH blind decode limit and the PDCCH control channel element limit.

As described above in connection with FIG. 4, a slot may be associated with a span-based PDCCH monitoring configuration having a minimum offset V between the starting symbol of two spans, and a maximum span duration (e.g., number of consecutive symbols) W. For example, if a UE monitors a PDCCH on a cell according to combination (V, W), the UE may support PDCCH monitoring occasions in any symbol of a slot with a minimum offset of V symbols between the initial symbols of two consecutive spans, including across slots. A span may start at a first symbol where a PDCCH monitoring occasion starts and may end at a last symbol where a PDCCH monitoring occasion ends, where the number of symbols of the span is less than or equal to W. One or more overbooking rules may be applied such that a quantity of blind decodes or a quantity of control channel elements do not exceed a PDCCH blind decode limit or a PDCCH control channel element limit of the configuration of the UE.

In some aspects, the PDCCH monitoring configuration may be applied at the slot level (e.g., in a multi-slot configuration). For example, as shown in FIG. 5, a plurality of individual slots may be numbered 0, 1, 2, 3, 4, 5, 6, and 7. One or more of the individual slots may be configured with a search space. For example, each of slots 1, 2, and 3 (shown as shaded slots) may be configured with one or more search spaces, whereas slots 0 and 4-7 (shown as non-shaded slots) may not be configured with any search spaces. The multi-slot (X, Y) configuration may indicate a minimum offset X between an initial slot of a first group of consecutive slots configured with a search space and an initial slot of a second group of consecutive slots configured with a search space, and a maximum number of consecutive slots Y configured with a search space, that is permitted, per group of slots.

The multi-slot configuration (e.g., similar to the span configuration) may support numerous configurations, such the (2, 2), (4, 3), and (7, 3) configurations described above in connection with FIG. 4, as well as the (8, 2) configuration shown in connection with FIG. 5. The variable X defines a minimum offset, so that, in the example of the (8, 2) multi-slot configuration, an initial slot of a group of consecutive slots configured with a search space must be at least eight (e.g., eight or more) slots from an initial slot of the next group of consecutive slots configured with a search space. In some aspects, the variable X may define a minimum offset between slots other than the initial slots in the group of consecutive slots. For example, the variable X may define a minimum offset between a last slot of a first group of consecutive slots configured with a search space and a last slot of a second group of consecutive slots configured with a search space. The maximum slot duration Y may define a maximum number of consecutive slots configured with a search space per group of slots, so the group of slots for the (8, 2) configuration may have a single slot, or the maximum of two consecutive slots, configured with a search space, without being overbooked.

In the example (X, Y) configuration shown in FIG. 5, a group of slots may be considered to be overbooked if a number of consecutive slots, in the group of slots, configured with a search space exceeds the maximum number of consecutive slots Y configured with a search space that is permitted per group of slots, according to the configuration. Additionally, or alternatively, the group of slots may be considered to be overbooked if an initial slot of the group of consecutive slots configured with a search space is not at least X slots from an initial slot of a neighboring group of consecutive slots configured with a search space.

In some aspects, a UE configured with a span-based configuration (such as the configuration described above in connection with FIG. 4) may not be able to perform PDCCH monitoring at the slot level. For example, while the UE configured with the span-based configuration may be configured to drop individual search spaces, the UE may not be able to drop all search spaces of an individual slot. Since a search space may be spread out among multiple slots, and since each slot may be configured with multiple search spaces, the UE may not be able to determine which search spaces, if any, it should drop, or is allowed to drop, in order to prevent overbooking.

For example, the group of slots 500 has three slots (e.g., slot 1, slot 2, and slot 3) that are configured with search spaces. Slot 1 may be configured with three search spaces (e.g., search spaces a, b, and c), slot 2 may be configured with four search spaces (e.g., search spaces a, b, c, and d), and slot 3 may be configured with three search spaces (e.g., search spaces b, c, and d) (not illustrated in FIG. 5). However, as described above, the UE having the (8, 2) configuration may only be able to monitor two consecutive slots configured with search spaces. Therefore, the group of slots is overbooked.

If the UE was only configured to drop individual search spaces, such as in the span-based configuration, the UE may not know which search spaces to drop in order to remove the overbooking. For example, the UE may determine that overbooking exists, and may determine (e.g., blindly) to drop search space b. However, dropping search space b may not remove the overbooking since the group of slots may still include three consecutive slots that are configured with search spaces. Specifically, slot 1 may be configured with search space a and c, slot 2 may be configured with search spaces a, c, and d, and slot 3 may be configured with search spaces c and d. Even though the UE dropped a search space, the group of slots still includes three consecutive slots that are configured with search spaces, and thus, all three slots may still need to be monitored by the UE. Therefore, since the UE is not configured to determine which search spaces that the UE should drop in order to reduce the number of consecutive slots configured with a search space, the overbooking may not be removed, even after one or more search spaces have been dropped. Additionally, the UE may not be configured with information that enables the UE to determine which search spaces the UE is allowed to drop. For example, dropping all search spaces of a slot that is configured with a common search space (e.g., a search space that is shared among the UE and one or more other UEs) may lead to errors in transmission to and from the network node.

Techniques and apparatuses described herein may enable the UE to drop search spaces at the slot level. For example, the techniques and apparatuses may enable the UE to drop all search spaces of a slot, or all search spaces of a plurality of slots. In some aspects, a UE having an (X, Y) configuration (e.g., multi-slot configuration) may be configured to monitor a maximum of Y consecutive slots configured with a search space, with a minimum offset of X slots between an initial slot of a first group of consecutive slots configured with a search space and an initial slot of a second group of consecutive slots configured with a search space. The UE may be configured to drop all search spaces of one or more slots, in accordance with the configuration, to remove an overbooking of the group of slots. Additionally, or alternatively, the techniques and apparatuses may configure the UE with one or more overbooking conditions (e.g., rules) to determine which search spaces the UE is allowed to drop, and which search spaces the UE is not allowed to drop, to remove the overbooking of the group of slots.

In some aspects, the UE may receive a configuration associated with one or more search spaces. The search spaces may be distributed across one or more slots. For example, a search space may span one or more slots, and each slot of a group of slots may be configured with one or more search spaces. The configuration may be a multi-slot configuration associated with a group of slots, such as the (X, Y) configuration described above. The UE may be configured to determine, based at least in part on one or more overbooking conditions, to drop all search spaces of an identified slot. For example, the one or more overbooking conditions may indicate that the UE should not drop any search spaces of a slot that is configured with a common search space and/or that the UE should drop all search spaces of one or more slots that are configured only with UE-specific search spaces in order to remove an overbooking. Configuring the UE with the overbooking conditions for dropping all search spaces of one or more slots may enable the UE to reduce a number of consecutive slots configured with a search space in order to remove an overbooking of the group of slots. The UE, based at least in part on dropping all search spaces of the one or more slots in accordance with the overbooking conditions, may monitor a remainder of the plurality of search spaces of the group of consecutive slots. As used herein, "dropping a search space" refers to foregoing monitoring for PDCCHs on PDCCH candidates of the search space.

The multi-slot configuration described herein may enable the UE to drop all search spaces of one or more slots in order to remove an overbooking. In some cases, a UE that detects an overbooking condition, while configured with a span-based configuration, may only be able to drop individual search spaces, which may or may not reduce the need to monitor individual slots. For example, if the UE drops a search space of a slot that is configured with multiple search spaces, the UE may still need to continue monitoring the slot (e.g., for PDCCH communications). In contrast, the multi-slot configuration described herein configures the UE with one or more overbooking conditions (e.g., rules) that enable the UE to drop all search spaces, such as all UE-specific search spaces, of one or more slots, without dropping search spaces, such as common search spaces, that should not be dropped. Therefore, the UE may no longer need to monitor the slots where all search spaces have been dropped, but may continue to monitor all search spaces of slots that have not been dropped, such as slots configured with common search spaces, without being overbooked.

As indicated above, FIG. 5 is provided as an example. Other examples may differ from what is described with respect to FIG. 5.

Figure 6:
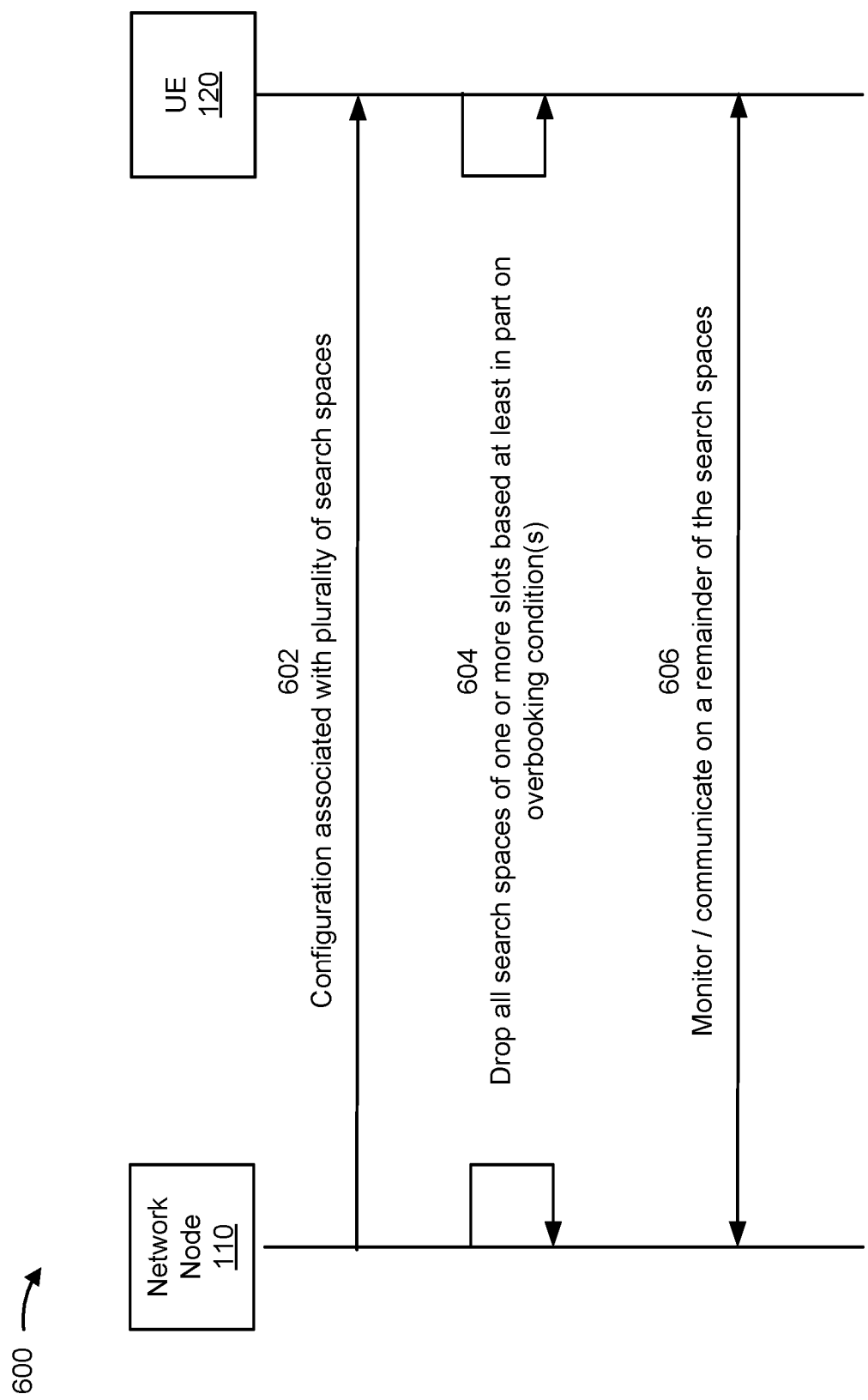
FIG. 6 is a diagram illustrating an example associated with slot level overbooking for multi-slot PDCCH monitoring, in accordance with the present disclosure.

FIG. 6 is a diagram illustrating an example 600 of slot level overbooking for multi-slot PDCCH monitoring, in accordance with the present disclosure.

As shown in connection with reference number 602, a network node, such as the network node 110, may transmit, and a UE, such as the UE 120, may receive, a configuration associated with multiple search spaces. The configuration may be based at least in part on a first indicator (e.g., X) that indicates a minimum gap (e.g., offset) between an initial slot of a first group of consecutive slots and an initial slot of a second group of consecutive slots, and second indicator (e.g., Y) that indicates a maximum number of consecutive slots per group of slots. The slots of the first group of consecutive slots and/or the slots of the second group of consecutive slots may configured with at least one search space. Each search space of the multiple search spaces may indicate a physical downlink control channel monitoring occasion. The configuration associated with the multiple search spaces may indicate capability information, such as the one or more (X, Y) pairs and the CCE limits and/or BD limits associated with the one or more (X, Y) pairs, as described above in connection with FIG. 4.

In some aspects, the configuration may be a multi-slot configuration (X, Y). The variable X may define the minimum offset, so that, in the example of the (8, 2) multi-slot configuration, an initial slot of a group of consecutive slots configured with a search space must be at least eight (e.g., eight or more) slots from an initial slot of the next group of consecutive slots configured with a search space. The maximum slot duration Y may define a maximum number of consecutive slots configured with a search space per group of slots, so the group of slots for the (8, 2) multi-slot configuration may have a single slot, or the maximum of two consecutive slots, configured with a search space, without being overbooked.

As described herein, a group of slots may be considered to be overbooked if the number of consecutive slots configured with a search space exceeds the maximum number of consecutive slots Y configured with a search space that is permitted, per group of slots, according to the configuration. Additionally, or alternatively, the group of slots may be considered to be overbooked if an initial slot of the group of consecutive slots configured with a search space is not at least eight slots from an initial slot of a neighboring group of consecutive slots configured with a search space. In some aspects, the one or more overbooking conditions may be applied to only a primary cell and not any secondary cells. Alternatively, the one or more overbooking conditions may be applied to a primary cell and one or more secondary cells. For example, applying the overbooking conditions to only a primary cell and not a secondary cell may allow for more flexibility in configuring primary cells and secondary cells differently, whereas applying the overbooking conditions to a primary cell and one or more secondary cell may allow for configuring the primary and secondary cells with the same configuration (e.g., less complex).

In some aspects, the initial slot of the first group of consecutive slots may be identified by a first system frame number, and the initial slot of the second group of consecutive slots may be identified by a second system frame number. A difference between the second system frame number and the first system frame number may be at least the minimum offset indicated by the first indicator. In some aspects, the initial slot of the first group of consecutive slots may be referred to as an anchor slot (e.g., a first anchor slot). The initial slot of the second group of consecutive slots may be a second anchor slot. The anchor slot of a group of consecutive slots is not limited to being the initial slot in a group of consecutive slots. For example, the anchor slot may be the last slot in a group of consecutive slots. However, the anchor slot should be defined consistently in each group of consecutive slots (e.g., defined as the initial slot in all of the groups of consecutive slots, or the last slot in all of the groups of consecutive slots). In some aspects, X may indicate a minimum gap or minimum offset between anchor slots in consecutive groups of slots.

As shown in connection with reference number 604, the UE 120 and/or the network node 110 may drop all search spaces of one or more slots. The UE 120 and/or the network node 110 may drop the search spaces (e.g., all search spaces) of the one or more slots based at least in part on detecting an overbooking in a group of consecutive slots. In some aspects, the UE 120 and/or the network node 110 may determine that all search spaces of a slot are to be dropped, as needed to remove an overbooking, based at least in part on the slot being configured only with UE-specific search spaces. In some aspects, the UE 120 and/or the network node 110 may determine that no search spaces of a particular slot are to be dropped based at least in part on the particular slot being configured with at least one common search space. In other words, in some aspects, the UE 120 and/or the network node 110 may drop a slot only if the slot includes one or more UE-specific search spaces and no common search spaces, and may not drop a slot if the slot includes at least one common search space. "Dropping a slot" is synonymous with "dropping all search spaces of a slot."

In some aspects, the UE 120 may identify an error condition based at least in part on a quantity of consecutive slots configured with at least one common search space in the first group of consecutive slots being greater than the maximum number of consecutive slots per group of slots. For example, the UE 120 may determine that a number of consecutive slots configured with a common search space in the group of slots exceeds the permitted number of consecutive slots in the (X, Y) configuration. However, the UE 120 and the network node 110 may refrain from dropping any of the slots that are configured with the common search space, and therefore, an error condition may result. An example illustration of an error condition is described below in connection with FIG. 8.

In some aspects, the UE 120 and/or the network node 110 may determine that a quantity of slots of the first group of consecutive slots is greater than the maximum number of consecutive slots per group of slots. The UE 120 and/or the network node 110 may be configured to drop all search spaces of an identified slot based at least in part on determining that the identified slot is configured only with UE-specific search spaces (e.g., not configured with any common search spaces) and based at least in part on determining that the quantity of slots of the first group of consecutive slots is greater than the maximum number of consecutive slots per group of slots. For example, the UE 120 and/or the network node 110 may be configured to determine that one or more slots need to be dropped due to an overbooking (e.g., based on Y), to identify one or more slots that are configured with only UE-specific search space(s), and to drop one or more of the identified slots to remove the overbooking. In some aspects, the UE may remove an overbooking by dropping all search spaces of one or more slots such that the group of consecutive slots having one or more search spaces does not exceed what is indicated (e.g., permitted) in the (X, Y) configuration. The UE 120 and/or the network node 110 may be configured to monitor a remainder of the search spaces of one or more slots that have not been dropped, including, but not limited to, all slots that are configured with at least one common search space.

In some aspects, dropping all search spaces of an identified slot may include dropping all search spaces of one or more initial slots (e.g., at the beginning) of the first group of consecutive slots configured with a search space. Referring to the group of slots 500 shown in FIG. 5, dropping all search spaces of one or more slots at the beginning of the first group of consecutive slots may include dropping slot 1 or dropping slots 1 and 2. In some aspects, dropping all search spaces of the identified slot may include dropping all search spaces of one or more last slots (e.g., at the end) of the first group of consecutive slots configured with a search space. Referring to the group of slots 500, dropping all search spaces of one or more slots at the end of the first group of consecutive slots may include dropping slot 3 or dropping slots 2 and 3. In some aspects, dropping all search spaces of the identified slot may include dropping all search spaces of one or more initial slots (e.g., at the beginning) of the first group of consecutive slots and one or more last slots (e.g., at the end) of the first group of consecutive slots configured with a search space. Referring to the group of slots 500, dropping all search spaces of one or more initial slots of the first group of consecutive slots and one or more last slots of the first group of consecutive slots configured with a search space may include dropping slots 1 and 3.

In some aspects, dropping all search spaces of the identified slot may include dropping all search spaces such that the number of consecutive slots configured with a search space is less than or equal to the maximum number of consecutive slots per group of slots configured with a search space. Referring to the group of slots 500, dropping all search spaces such that the number of consecutive slots configured with a search space is less than or equal to the maximum number of consecutive slots per group of slots configured with a search space may include dropping slot 1, slot 3, slots 1 and 2, slots 1 and 3, or slots 2 and 3.

In some aspects, dropping all search spaces of the identified slot may include dropping all search spaces such that the number of consecutive slots configured with a search space is less than the maximum number of consecutive slots per group of slots configured with a search space. Referring to the group of slots 500, dropping all search spaces such that the number of consecutive slots configured with a search space is less than or equal to the maximum number of consecutive slots per group of slots configured with a search space may include dropping slots 1 and 2, slots 1 and 3, or slots 2 and 3.

In some aspects, a first group of consecutive slots and a second group of consecutive slots may be configured with only one or more UE-specific search spaces. The first group of consecutive slots may have a first number of slots and the second group of consecutive slots may have a second number of slots. In some aspects, the UE 120 and/or the network node 110 may determine that the first number of slots is greater than the second number of slots. Based at least in part on this determination, the UE 120 and/or the network node 110 may be configured to drop the search spaces of the second group of consecutive slots and to monitor the search spaces of the first group of consecutive slots. Thus, the UE 120 and/or the network node 110 may be configured to drop all search spaces of the group of consecutive slots having the lower number of consecutive slots configured with search spaces. This example can be applied to any number of groups of consecutive slots. For example, the UE 120 and/or the network node 110 may be configured to drop all search spaces of a group of consecutive slots having the lowest number of consecutive slots configured with search spaces, as compared to a plurality of groups of consecutive slots configured with search spaces. This may enable the UE 120 and/or the network node 110 to drop fewer search spaces, rather than dropping a greater number of consecutive slots configured with search spaces, resulting in a larger number of overall dropped search spaces.

In some aspects, the UE 120 and/or the network node 110 may determine that the first number of slots is equal to the second number of slots. Based at least in part on this determination, the UE 120 and/or the network node 110 may be configured to drop the search spaces of the first group of consecutive slots or the second group of consecutive slots based at least in part on the one or more overbooking conditions, and to monitor the search spaces of the remainder of the first group of consecutive slots or the second group of consecutive slots. For example, the UE 120 and/or the network node 110 may determine, based at least in part on the one or more overbooking conditions, to drop the search spaces of the second group of consecutive slots and to monitor the search spaces of the first group of consecutive slots. The UE 120 and the network node 110 may be configured with a similar (e.g., the same) set of rules, such that the UE 120 and the network node 110 are configured to drop all search spaces of the same group of consecutive slots, thereby reducing ambiguity between the UE 120 and the network node 110.

As shown in connection with reference number 606, the UE 120 and/or the network node 110 may monitor a remainder of the search spaces. For example, the UE 120 and/or the network node 110 may monitor the search spaces of all slots configured with a search space that were not dropped in accordance with the multi-slot configuration. Monitoring a remainder of the search spaces of one or more slots may include monitoring the search spaces of all slots configured with a common search space. Referring to the group of slots 500, the UE 120 and/or the network node 110 may be configured to monitor slot 1 based at least in part on dropping slots 2 and 3, to monitor slots 1 and 2 based at least in part on dropping slot 3, to monitor slot 2 based at least in part on dropping slots 1 and 3, to monitor slots 2 and 3 based at least in part on dropping slot 1, and/or to monitor slot 3 based at least in part on dropping slots 1 and 2. In some aspects, the UE 120 and/or the network node 110 may communicate using the remainder of the search spaces.

As described herein, the multi-slot configuration may enable the UE 120 and/or the network node 110 to drop all search spaces of one or more slots to remove an overbooking. In some cases, a UE that detects an overbooking condition, while configured with a span-based configuration, may only be able to drop individual search spaces, which may or may not reduce the need to monitor individual slots. For example, if the UE drops a search space of a slot that is configured with multiple search spaces, the UE may still need to continue monitoring the slot (e.g., for PDCCH communications). In contrast, the multi-slot configuration described herein configures the UE with one or more rules (e.g., overbooking conditions) that enable the UE to drop all search spaces, such as all UE-specific search spaces, of one or more slots, without dropping search spaces, such as common search spaces, that should not be dropped. Therefore, the UE may no longer need to monitor the slots where all search spaces have been dropped, but may continue to monitor all search spaces of slots that have not been dropped, such as slots configured with common search spaces, without being overbooked.

As indicated above, FIG. 6 is provided as an example. Other examples may differ from what is described with respect to FIG. 6.

FIGS. 7-11, described in detail below, illustrate various examples of search space dropping. The figures show a number of slots numbered consecutively, starting from 0. The number of slots may include a group of consecutive slots configured with a search space. A search space may span one or more of the slots. For example, each slot may be identified as having no search spaces configured, as having a common search space configured, or as having a UE-specific only search space configured, as shown in the figures. A slot with a common search space configured may include a slot that is configured with only a common search space (and not a UE-specific search space) or may include a slot that is configured with both a common search space and a UE-specific search space. In the figures, search space is abbreviated as SS, common search space is abbreviated as CSS, and UE-specific search space is configured as USS.

FIG. 7 is a diagram illustrating a first example 700 of dropping all search spaces of a slot in accordance with an overbooking condition, in accordance with the present disclosure. As shown in FIG. 7, a number of slots may include eight slots numbered 0-7. Slots 1 and 2 may be configured with a common search space, slot 3 may be configured with only a UE-specific search space, and slots 0 and 4-7 may be configured with no search spaces. The UE 120 may be configured with an (8, 2) multi-slot configuration. As described above (e.g., in connection with FIG. 6), the UE 120 and/or the network node 110 may be configured to drop all search spaces of slot 3, which is configured with only the UE-specific search space, to remove the overbooking.

FIG. 8 is a diagram illustrating a second example 800 of dropping all search spaces of a slot in accordance with an overbooking condition, in accordance with the present disclosure. As shown in FIG. 8, a number of slots may include eight slots numbered 1-7. Slots 1, 2, and 3 may be configured with a common search space, and slots 0 and 4-7 may be configured with no search spaces. The UE 120 may be configured with an (8, 2) multi-slot configuration. As described above (e.g., in connection with FIG. 6), the UE 120 and/or the network node 110 may not be able to drop any of the common search spaces. Thus, the UE 120 cannot remove the overbooking, resulting in an error case.

FIG. 9 is a diagram illustrating a third example 900 of dropping all search spaces of a slot in accordance with an overbooking condition, in accordance with the present disclosure. As shown in FIG. 9, a number of slots may include eight slots numbered 1-7. Slot 2 may be configured with a common search space, slots 1 and 3 may be configured with only a UE-specific search space, and slots 0 and 4-7 may be configured with no search spaces. The UE 120 may be configured with an (8, 2) multi-slot configuration. As described above (e.g., in connection with FIG. 6), the UE 120 and/or the network node 110 may be configured drop all search spaces of slot 1 and/or slot 3 to remove the overbooking. The UE 120 and/or the network node 110 may determine whether to drop all search spaces of slot 1, all search spaces of slot 3, or all search spaces of slots 1 and 3 based at least in part on the one or more overbooking conditions (e.g., rules).

Figure 10:
FIG. 10 is a diagram illustrating a fourth example associated with dropping all search spaces of a slot in accordance with an overbooking condition, in accordance with the present disclosure.

FIG. 10 is a diagram illustrating a fourth example 1000 of dropping all search spaces of a slot in accordance with an overbooking condition, in accordance with the present disclosure. As shown in FIG. 10, a number of slots may include eight slots numbered 1-7. Slot 2 may be configured with a common search space, slots 1 and 3 may be configured with only a UE-specific search space, and slots 0 and 4-7 may be configured with no search spaces. The UE 120 may be configured with an (8, 4) multi-slot configuration. The (8, 4) configuration allows up to four consecutive slots to be configured with one or more search spaces. In this example, since the group of slots includes three consecutive slots configured with one or more search spaces, no overbooking exists. Thus, the UE 120 and the network node 110 do not need to drop any search spaces of any of the slots.

Figure 11:
FIG. 11 is a diagram illustrating a fifth example associated with dropping all search spaces of a slot in accordance with an overbooking condition, in accordance with the present disclosure.

FIG. 11 is a diagram illustrating a fifth example 1100 of dropping all search spaces of a slot in accordance with an overbooking condition, in accordance with the present disclosure. As shown in FIG. 11, a number of slots may include a first set of slots 0-7 and a second set of slots 8-15. The first group of consecutive slots may include two consecutive slots configured with a search space, with slot 1 being configured with only a UE-specific search space, slot 2 being configured with a common search space, and slots 0 and 3-7 being configured with no search spaces. The second group of consecutive slots may include three consecutive slots configured with a search space, with slot 9 being configured with a common search space, slots 8 and 10 being configured with only a UE-specific search space, and slots 11-15 being configured with no search spaces. The UE 120 may be configured with an (8, 2) multi-slot configuration.

As described above (e.g., in connection with FIG. 6), the UE 120 and/or the network node 110 may be configured to drop all search spaces of slot 8 to remove the overbooking. For example, the offset between slots 1 and slots 8 (both configured with USS only search spaces) is 7 (e.g., 7 slots). Because the offset between slot 1, the initial slot in the first group of consecutive slots configured with a search space, and slot 8, the initial slot in the second group of consecutive slots, is less than X, and because slot 8 is configured with only UE-specific search spaces, the UE 120 and/or the network node 110 may be configured to drop all search spaces of slot 8 to remove the overbooking. Since there is an 8 slot offset between slot 1 and slot 9, the overbooking condition may be considered successfully removed.

As indicated above, FIGS. 7-11 are provided as one or more examples. Other examples may differ from what is described with respect to FIGS. 7-11.

Figure 12:
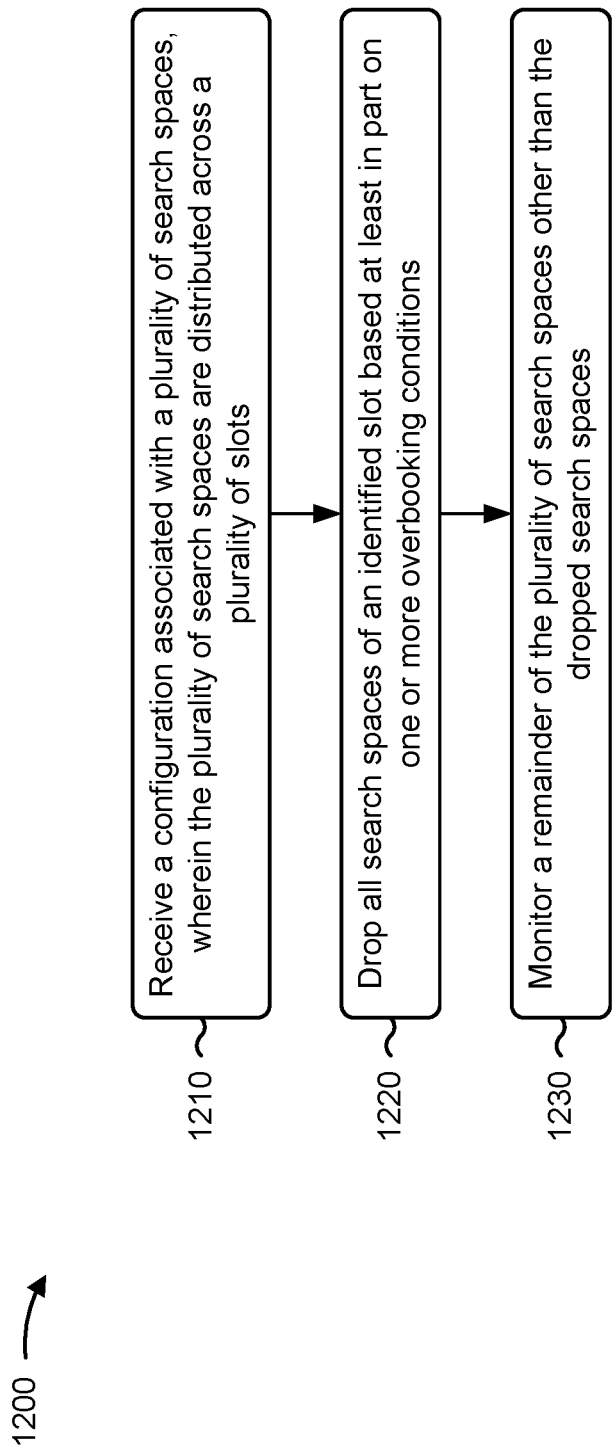
FIG. 12 is a diagram illustrating an example process associated with slot level overbooking for multi-slot PDCCH monitoring, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with slot level overbooking for multi-slot PDCCH monitoring.

As shown in FIG. 12, in some aspects, process 1200 may include receiving a configuration associated with a plurality of search spaces, wherein the plurality of search spaces are distributed across a plurality of slots (block 1210). For example, the UE (e.g., using communication manager 140 and/or reception component 1402, depicted in FIG. 14) may receive a configuration associated with a plurality of search spaces, wherein the plurality of search spaces are distributed across a plurality of slots, as described above.

As further shown in FIG. 12, in some aspects, process 1200 may include dropping all search spaces of an identified slot based at least in part on one or more overbooking conditions (block 1220). For example, the UE (e.g., using communication manager 140, determination component 1408, and/or dropping component 1410, depicted in FIG. 14) may drop all search spaces of an identified slot based at least in part on one or more overbooking conditions, as described above.

As further shown in FIG. 12, in some aspects, process 1200 may include monitoring a remainder of the plurality of search spaces other than the dropped search spaces (block 1230). For example, the UE (e.g., using communication manager 140 and/or monitoring component 1412, depicted in FIG. 14) may monitor a remainder of the plurality of search spaces other than the dropped search spaces, as described above.

Process 1200 may include additional aspects, such as any single aspect or any combination of aspects described below and/or in connection with one or more other processes described elsewhere herein.

In a first aspect, the configuration is based at least in part on a first indicator that indicates a minimum gap between an initial slot of a first group of consecutive slots, of the plurality of slots, and an initial slot of a second group of consecutive slots, of the plurality of slots, wherein each slot of the first group of consecutive slots and the second group of consecutive slots is configured with at least one search space, and a second indicator that indicates a maximum number of consecutive slots per group of slots.

In a second aspect, alone or in combination with the first aspect, process 1200 includes determining that all search spaces of a particular slot are not to be dropped based at least in part on the particular slot including at least one common search space.

In a third aspect, alone or in combination with one or more of the first and second aspects, process 1200 includes identifying an error condition based at least in part on a quantity of consecutive slots configured with at least one common search space in the first group of consecutive slots being greater than the maximum number of consecutive slots per group of slots.

In a fourth aspect, alone or in combination with one or more of the first through third aspects, process 1200 includes determining that a quantity of slots of the first group of consecutive slots is greater than the maximum number of consecutive slots per group of slots, wherein dropping all search spaces of the identified slot is based at least in part on all search spaces of the identified slot being UE-specific search spaces and based at least in part on determining that the quantity of slots of the first group of consecutive slots is greater than the maximum number of consecutive slots per group of slots.

In a fifth aspect, alone or in combination with one or more of the first through fourth aspects, monitoring the remainder of the plurality of search spaces comprises monitoring one or more search spaces of all slots, of the plurality of slots, that are configured with at least one common search space.

In a sixth aspect, alone or in combination with one or more of the first through fifth aspects, dropping all search spaces of the identified slot comprises dropping all search spaces of one or more initial slots of the first group of consecutive slots.

In a seventh aspect, alone or in combination with one or more of the first through sixth aspects, dropping all search spaces of the identified slot comprises dropping all search spaces of one or more last slots of the first group of consecutive slots.

In an eighth aspect, alone or in combination with one or more of the first through seventh aspects, dropping all search spaces of the identified slot comprises dropping all search spaces of one or more initial slots of the first group of consecutive slots and one or more last slots of the first group of consecutive slots.

In a ninth aspect, alone or in combination with one or more of the first through eighth aspects, dropping all search spaces of the identified slot comprises dropping all search spaces such that the number of consecutive slots configured with a search space is less than or equal to the maximum number of consecutive slots per group of slots.

In a tenth aspect, alone or in combination with one or more of the first through ninth aspects, the first group of consecutive slots and the second group of consecutive slots are configured with only one or more UE-specific search spaces, wherein the first group of consecutive slots has a first number of slots and the second group of consecutive slots has a second number of slots.

In an eleventh aspect, alone or in combination with one or more of the first through tenth aspects, process 1200 includes dropping, based at least in part on the first number of slots being greater than the second number of slots, the search spaces of the second group of consecutive slots, and monitoring, based at least in part on dropping the search spaces of the second group of consecutive slots, the search spaces of the first group of consecutive slots.

In a twelfth aspect, alone or in combination with one or more of the first through eleventh aspects, process 1200 includes dropping, based at least in part on the first number of slots being equal to the second number of slots, the search spaces of the first group of consecutive slots or the second group of consecutive slots based at least in part on the one or more overbooking conditions, and monitoring, based at least in part on dropping the search spaces of the first group of consecutive slots or the second group of consecutive slots, the search spaces of the remainder of the first group of consecutive slots or the second group of consecutive slots.

In a thirteenth aspect, alone or in combination with one or more of the first through twelfth aspects, the initial slot of the first group of consecutive slots is identified by a first system frame number and the initial slot of the second group of consecutive slots is identified by a second system frame number, wherein a difference between the second system frame number and the first system frame number is at least the minimum gap indicated by the first indicator.

In a fourteenth aspect, alone or in combination with one or more of the first through thirteenth aspects, process 1200 includes transmitting or receiving capability information that includes the first indicator and the second indicator.

In a fifteenth aspect, alone or in combination with one or more of the first through fourteenth aspects, the one or more overbooking conditions are configured to be applied to only a primary cell and not any secondary cells.

In a sixteenth aspect, alone or in combination with one or more of the first through fifteenth aspects, the one or more overbooking conditions are configured to be applied to a primary cell and one or more secondary cells.

In a seventeenth aspect, alone or in combination with one or more of the first through sixteenth aspects, each search space of the plurality of search spaces indicates a physical downlink control channel monitoring occasion.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
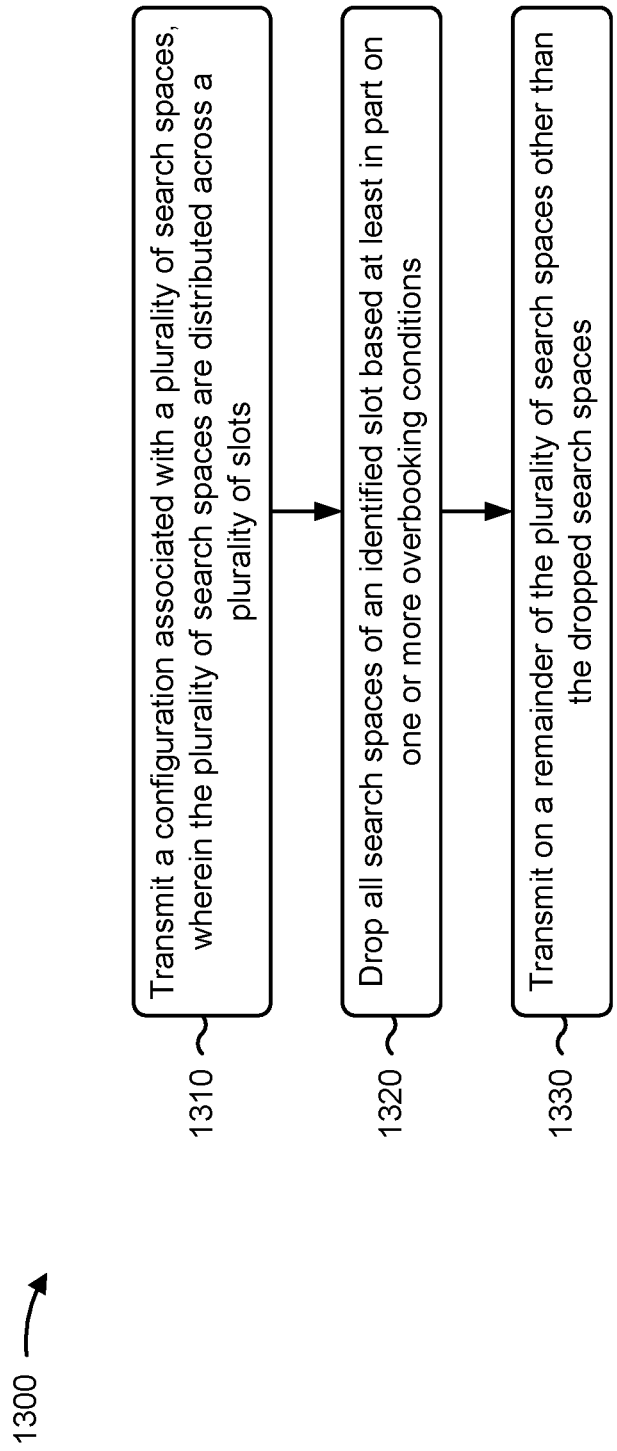
FIG. 13 is a diagram illustrating an example process associated with slot level overbooking for multi-slot PDCCH monitoring, in accordance with the present disclosure.

FIG. 13 is a diagram illustrating an example process 1300 performed, for example, by a network node, in accordance with the present disclosure. Example process 1300 is an example where the network node (e.g., network node 110) performs operations associated with slot level overbooking for multi-slot PDCCH monitoring.

As shown in FIG. 13, in some aspects, process 1300 may include transmitting a configuration associated with a plurality of search spaces, wherein the plurality of search spaces are distributed across a plurality of slots (block 1310). For example, the network node (e.g., using communication manager 150 and/or transmission component 1504, depicted in FIG. 15) may transmit a configuration associated with a plurality of search spaces, wherein the plurality of search spaces are distributed across a plurality of slots, as described above.

As further shown in FIG. 13, in some aspects, process 1300 may include dropping all search spaces of an identified slot based at least in part on one or more overbooking conditions (block 1320). For example, the network node (e.g., using communication manager 150, determination component 1508 and/or dropping component 1510, depicted in FIG. 15) may drop all search spaces of an identified slot based at least in part on one or more overbooking conditions, as described above.

As further shown in FIG. 13, in some aspects, process 1300 may include transmitting on a remainder of the plurality of search spaces other than the dropped search spaces (block 1330). For example, the network node (e.g., using communication manager 150 and/or transmission component 1504, depicted in FIG. 15) may transmit on a remainder of the plurality of search spaces other than the dropped search spaces, as described above.

Process 1300 may include additional aspects, such as any single aspect or any combination of aspects described below and/or in connection with one or more other processes described elsewhere herein.

In a first aspect, the configuration is based at least in part on a first indicator that indicates a minimum gap between an initial slot of a first group of consecutive slots, of the plurality of slots, and an initial slot of a second group of consecutive slots, of the plurality of slots, wherein each slot of the first group of consecutive slots and the second group of consecutive slots is configured with at least one search space, and a second indicator that indicates a maximum number of consecutive slots per group of slots.

In a second aspect, alone or in combination with the first aspect, process 1300 includes determining that all search spaces of a particular slot are not to be dropped based at least in part on the particular slot including at least one common search space.

In a third aspect, alone or in combination with one or more of the first and second aspects, process 1300 includes identifying an error condition based at least in part on a quantity of consecutive slots configured with at least one common search space in the first group of consecutive slots being greater than the maximum number of consecutive slots per group of slots.

In a fourth aspect, alone or in combination with one or more of the first through third aspects, process 1300 includes determining that a quantity of slots of the first group of consecutive slots is greater than the maximum number of consecutive slots per group of slots, wherein dropping all search spaces of the identified slot is based at least in part on all search spaces of the identified slot being UE-specific search spaces and based at least in part on determining that the quantity of slots of the first group of consecutive slots is greater than the maximum number of consecutive slots per group of slots.

In a fifth aspect, alone or in combination with one or more of the first through fourth aspects, transmitting on the remainder of the plurality of search spaces comprises transmitting on one or more search spaces of all slots, of the plurality of slots, that are configured with at least one common search space.

In a sixth aspect, alone or in combination with one or more of the first through fifth aspects, dropping all search spaces of the identified slot comprises dropping all search spaces of one or more initial slots of the first group of consecutive slots.

In a seventh aspect, alone or in combination with one or more of the first through sixth aspects, dropping all search spaces of the identified slot comprises dropping all search spaces of one or more last slots of the first group of consecutive slots.

In an eighth aspect, alone or in combination with one or more of the first through seventh aspects, dropping all search spaces of the identified slot comprises dropping all search spaces of one or more initial slots of the first group of consecutive slots and one or more last slots of the first group of consecutive slots.

In a ninth aspect, alone or in combination with one or more of the first through eighth aspects, dropping all search spaces of the identified slot comprises dropping all search spaces such that the number of consecutive slots configured with a search space is less than or equal to the maximum number of consecutive slots per group of slots.

In a tenth aspect, alone or in combination with one or more of the first through ninth aspects, the first group of consecutive slots and the second group of consecutive slots are configured with only one or more UE-specific search spaces, wherein the first group of consecutive slots has a first number of slots and the second group of consecutive slots has a second number of slots.

In an eleventh aspect, alone or in combination with one or more of the first through tenth aspects, process 1300 includes dropping, based at least in part on the first number of slots being greater than the second number of slots, the search spaces of the second group of consecutive slots, and transmitting on, based at least in part on dropping the search spaces of the second group of consecutive slots, the search spaces of the first group of consecutive slots.

In a twelfth aspect, alone or in combination with one or more of the first through eleventh aspects, process 1300 includes dropping, based at least in part on the first number of slots being equal to the second number of slots, the search spaces of the first group of consecutive slots or the second group of consecutive slots based at least in part on the one or more overbooking conditions, and transmitting on, based at least in part on dropping the search spaces of the first group of consecutive slots or the second group of consecutive slots, the search spaces of the remainder of the first group of consecutive slots or the second group of consecutive slots.

In a thirteenth aspect, alone or in combination with one or more of the first through twelfth aspects, the initial slot of the first group of consecutive slots is identified by a first system frame number and the initial slot of the second group of consecutive slots is identified by a second system frame number, wherein a difference between the second system frame number and the first system frame number is at least the minimum gap indicated by the first indicator.

In a fourteenth aspect, alone or in combination with one or more of the first through thirteenth aspects, process 1300 includes transmitting or receiving capability information that includes the first indicator and the second indicator.

In a fifteenth aspect, alone or in combination with one or more of the first through fourteenth aspects, the one or more overbooking conditions are configured to be applied to only a primary cell and not any secondary cells.

In a sixteenth aspect, alone or in combination with one or more of the first through fifteenth aspects, the one or more overbooking conditions are configured to be applied to a primary cell and one or more secondary cells.

In a seventeenth aspect, alone or in combination with one or more of the first through sixteenth aspects, each search space of the plurality of search spaces indicates a physical downlink control channel monitoring occasion.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
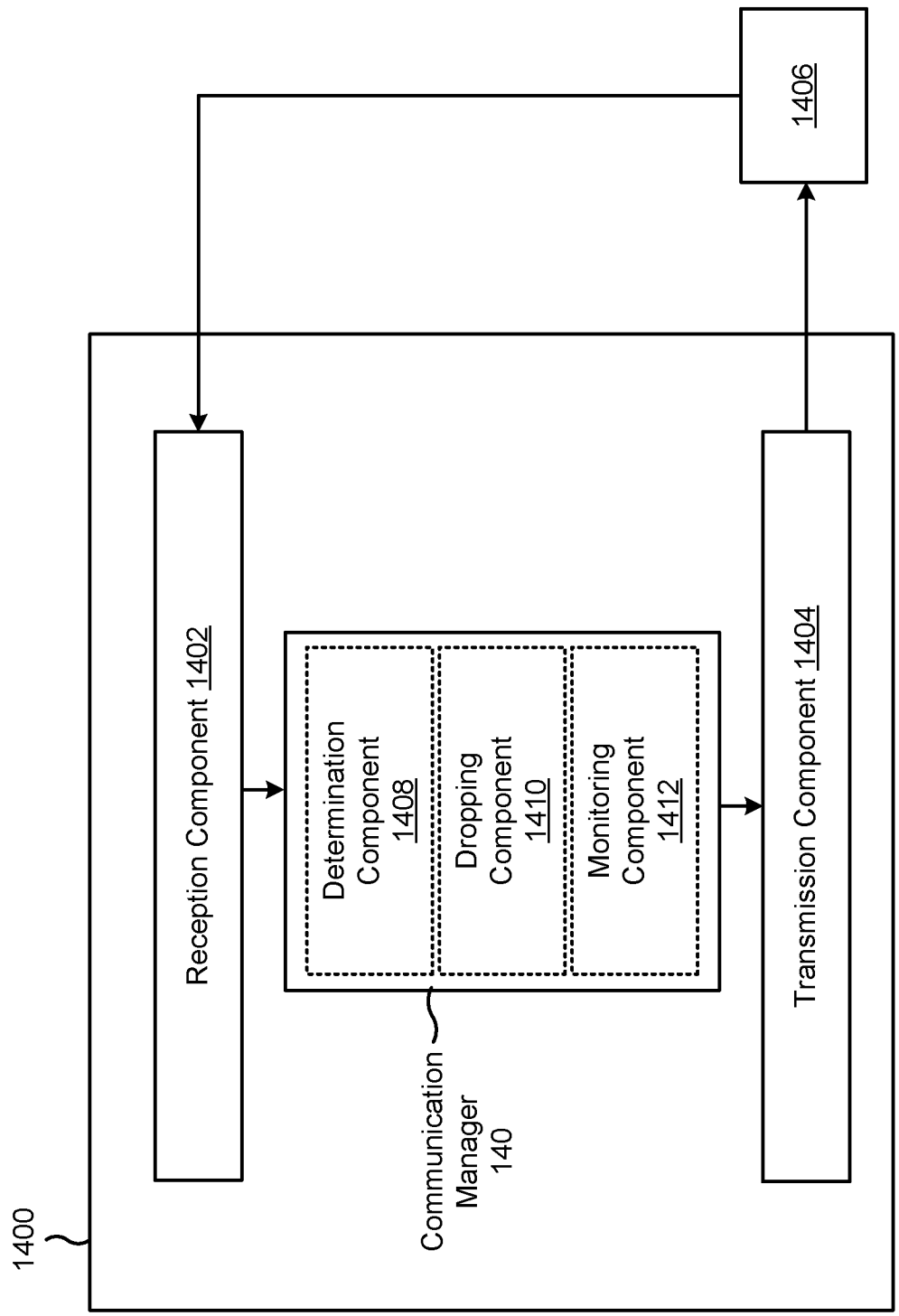
FIG. 14 is a diagram of an example apparatus for wireless communication, in accordance with the present disclosure.

FIG. 14 is a diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a network node, or another wireless communication device) using the reception component 1402 and the transmission component 1404. As further shown, the apparatus 1400 may include the communication manager 140. The communication manager 140 may include one or more of a determination component 1408, a dropping component 1410, or a monitoring component 1412, among other examples.

In some aspects, the apparatus 1400 may be configured to perform one or more operations described herein in connection with FIGS. 3-15. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The reception component 1402 may receive a configuration associated with a plurality of search spaces, wherein the plurality of search spaces are distributed across a plurality of slots. The dropping component 1410 may drop all search spaces of an identified slot based at least in part on one or more overbooking conditions. The monitoring component 1412 may monitor a remainder of the plurality of search spaces other than the dropped search spaces.

The determination component 1408 may determine that all search spaces of a particular slot are not to be dropped based at least in part on the particular slot including at least one common search space.

The determination component 1408 may identify an error condition based at least in part on a quantity of consecutive slots configured with at least one common search space in the first group of consecutive slots being greater than the maximum number of consecutive slots per group of slots.

The determination component 1408 may determine that a quantity of slots of the first group of consecutive slots is greater than the maximum number of consecutive slots per group of slots, wherein dropping all search spaces of the identified slot is based at least in part on all search spaces of the identified slot being UE-specific search spaces and based at least in part on determining that the quantity of slots of the first group of consecutive slots is greater than the maximum number of consecutive slots per group of slots.

The dropping component 1410 may drop, based at least in part on the first number of slots being greater than the second number of slots, the search spaces of the second group of consecutive slots.

The monitoring component 1412 may monitor, based at least in part on dropping the search spaces of the second group of consecutive slots, the search spaces of the first group of consecutive slots.

The dropping component 1410 may drop, based at least in part on the first number of slots being equal to the second number of slots, the search spaces of the first group of consecutive slots or the second group of consecutive slots based at least in part on the one or more overbooking conditions.

The monitoring component 1412 may monitor, based at least in part on dropping the search spaces of the first group of consecutive slots or the second group of consecutive slots, the search spaces of the remainder of the first group of consecutive slots or the second group of consecutive slots.

The transmission component 1404 may transmit or receiving capability information that includes the first indicator and the second indicator.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
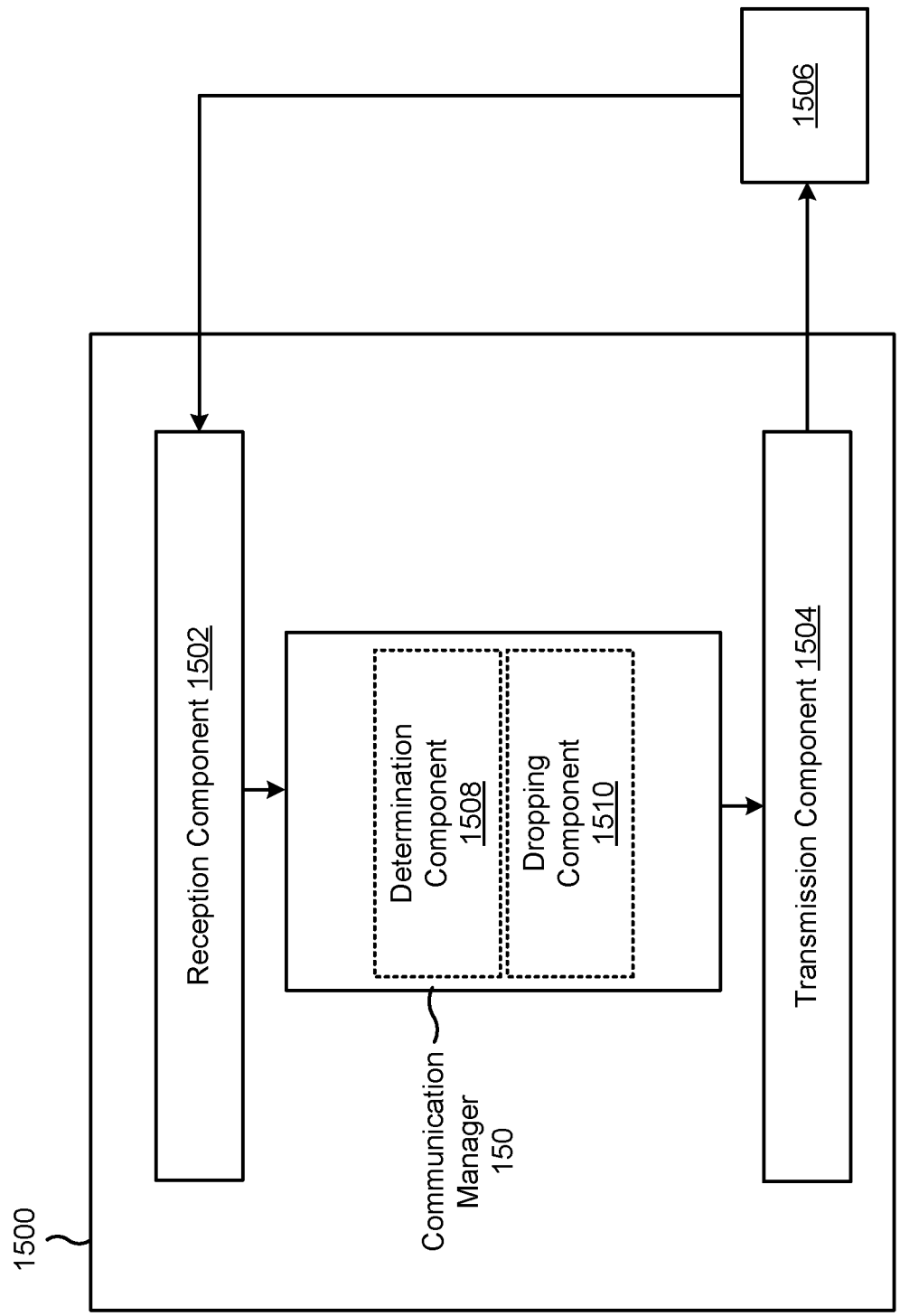
FIG. 15 is a diagram of an example apparatus for wireless communication, in accordance with the present disclosure.

FIG. 15 is a diagram of an example apparatus 1500 for wireless communication. The apparatus 1500 may be a network node, or a network node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a network node, or another wireless communication device) using the reception component 1502 and the transmission component 1504. As further shown, the apparatus 1500 may include the communication manager 150. The communication manager 150 may include one or more of a determination component 1508 or a dropping component 1510, among other examples.

In some aspects, the apparatus 1500 may be configured to perform one or more operations described herein in connection with FIGS. 3-15. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the network node described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network node described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the network node described in connection with FIG. 2. In some aspects, the transmission component 1504 may be co-located with the reception component 1502 in a transceiver.

The transmission component 1504 may transmit a configuration associated with a plurality of search spaces, wherein the plurality of search spaces are distributed across a plurality of slots. The dropping component 1510 may drop all search spaces of an identified slot based at least in part on one or more overbooking conditions. The transmission component 1504 may transmit on a remainder of the plurality of search spaces other than the dropped search spaces.

The determination component 1508 may determine that all search spaces of a particular slot are not to be dropped based at least in part on the particular slot including at least one common search space.

The determination component 1508 may identify an error condition based at least in part on a quantity of consecutive slots configured with at least one common search space in the first group of consecutive slots being greater than the maximum number of consecutive slots per group of slots.

The determination component 1508 may determine that a quantity of slots of the first group of consecutive slots is greater than the maximum number of consecutive slots per group of slots, wherein dropping all search spaces of the identified slot is based at least in part on all search spaces of the identified slot being UE-specific search spaces and based at least in part on determining that the quantity of slots of the first group of consecutive slots is greater than the maximum number of consecutive slots per group of slots.

The dropping component 1510 may drop, based at least in part on the first number of slots being greater than the second number of slots, the search spaces of the second group of consecutive slots.

The transmission component 1504 may transmit on, based at least in part on dropping the search spaces of the second group of consecutive slots, the search spaces of the first group of consecutive slots.

The dropping component 1510 may drop, based at least in part on the first number of slots being equal to the second number of slots, the search spaces of the first group of consecutive slots or the second group of consecutive slots based at least in part on the one or more overbooking conditions.

The transmission component 1504 may transmit on, based at least in part on dropping the search spaces of the first group of consecutive slots or the second group of consecutive slots, the search spaces of the remainder of the first group of consecutive slots or the second group of consecutive slots.

The transmission component 1504 may transmit or receiving capability information that includes the first indicator and the second indicator.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 16:
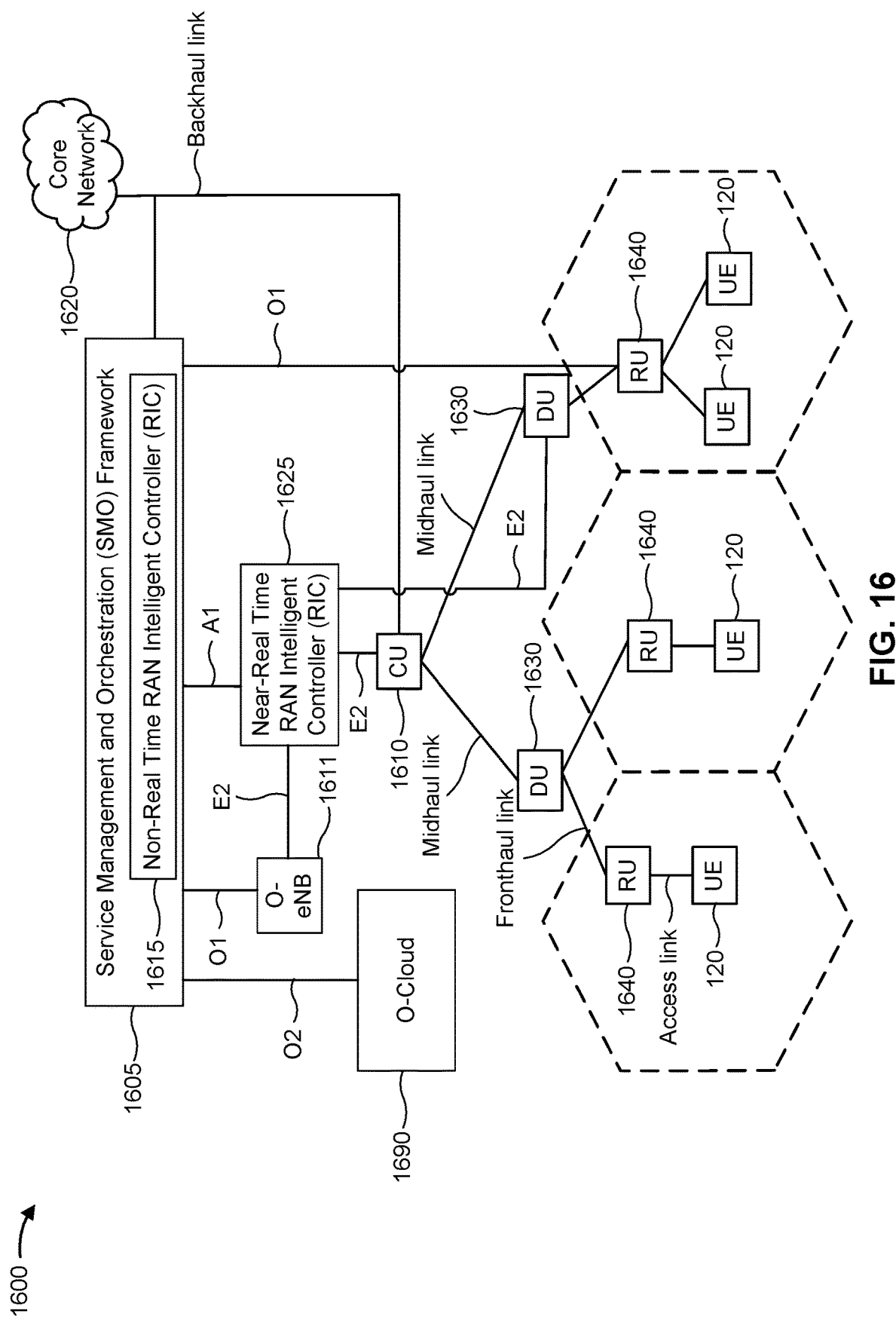
FIG. 16 is a diagram illustrating an example of a disaggregated network node architecture, in accordance with the present disclosure.

FIG. 16 is a diagram illustrating an example disaggregated base station architecture 1600, in accordance with the present disclosure. The disaggregated base station architecture 1600 may include a CU 1610 that can communicate directly with a core network 1620 via a backhaul link, or indirectly with the core network 1620 through one or more disaggregated control units (such as a Near-RT RIC 1625 via an E2 link, or a Non-RT RIC 1615 associated with a Service Management and Orchestration (SMO) Framework 1605, or both). A CU 1610 may communicate with one or more DUs 1630 via respective midhaul links, such as through F1 interfaces. Each of the DUs 1630 may communicate with one or more RUs 1640 via respective fronthaul links. Each of the RUs 1640 may communicate with one or more UEs 120 via respective radio frequency (RF) access links. In some implementations, a UE 120 may be simultaneously served by multiple RUs 1640.

Each of the units, including the CUs 1610, the DUs 1630, the RUs 1640, as well as the Near-RT RICs 1625, the Non-RT RICs 1615, and the SMO Framework 1605, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 1610 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 1610. The CU 1610 may be configured to handle user plane functionality (for example, Central Unit-User Plane (CU-UP) functionality), control plane functionality (for example, Central Unit-Control Plane (CU-CP) functionality), or a combination thereof. In some implementations, the CU 1610 can be logically split into one or more CU-UP units and one or more CU-CP units. A CU-UP unit can communicate bidirectionally with a CU-CP unit via an interface, such as the E1 interface when implemented in an O-RAN configuration. The CU 1610 can be implemented to communicate with a DU 1630, as necessary, for network control and signaling.

Each DU 1630 may correspond to a logical unit that includes one or more base station functions to control the operation of one or more RUs 1640. In some aspects, the DU 1630 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 1630 may further host one or more low PHY layers, such as implemented by one or more modules for a fast Fourier transform (FFT), an inverse FFT (iFFT), digital beamforming, or PRACH extraction and filtering, among other examples. Each layer (which also may be referred to as a module) can be implemented with an interface configured to communicate signals with other layers (and modules) hosted by the DU 1630, or with the control functions hosted by the CU 1610.

Each RU 1640 may implement lower-layer functionality. In some deployments, an RU 1640, controlled by a DU 1630, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 1640 can be operated to handle over the air (OTA) communication with one or more UEs 120. In some implementations, real-time and non-real-time aspects of control and user plane communication with the RU(s) 1640 can be controlled by the corresponding DU 1630. In some scenarios, this configuration can enable each DU 1630 and the CU 1610 to be implemented in a cloud-based RAN architecture, such as a vRAN architecture.

The SMO Framework 1605 may be configured to support RAN deployment and provisioning of non-virtualized and virtualized network elements. For non-virtualized network elements, the SMO Framework 1605 may be configured to support the deployment of dedicated physical resources for RAN coverage requirements, which may be managed via an operations and maintenance interface (such as an O1 interface). For virtualized network elements, the SMO Framework 1605 may be configured to interact with a cloud computing platform (such as an open cloud (O-Cloud) platform 1690) to perform network element life cycle management (such as to instantiate virtualized network elements) via a cloud computing platform interface (such as an O2 interface). Such virtualized network elements can include, but are not limited to, CUs 1610, DUs 1630, RUs 1640, non-RT RICs 1615, and Near-RT RICs 1625. In some implementations, the SMO Framework 1605 can communicate with a hardware aspect of a 4G RAN, such as an open eNB (O-eNB) 1611, via an O1 interface. Additionally, in some implementations, the SMO Framework 1605 can communicate directly with each of one or more RUs 1640 via a respective O1 interface. The SMO Framework 1605 also may include a Non-RT RIC 1615 configured to support functionality of the SMO Framework 1605.

The Non-RT RIC 1615 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1625. The Non-RT RIC 1615 may be coupled to or communicate with (such as via an A1 interface) the Near-RT RIC 1625. The Near-RT RIC 1625 may be configured to include a logical function that enables near-real-time control and optimization of RAN elements and resources via data collection and actions over an interface (such as via an E2 interface) connecting one or more CUs 1610, one or more DUs 1630, or both, as well as an O-eNB, with the Near-RT RIC 1625.

In some implementations, to generate AI/ML models to be deployed in the Near-RT RIC 1625, the Non-RT RIC 1615 may receive parameters or external enrichment information from external servers. Such information may be utilized by the Near-RT RIC 1625 and may be received at the SMO Framework 1605 or the Non-RT MC 1615 from non-network data sources or from network functions. In some examples, the Non-RT MC 1615 or the Near-RT MC 1625 may be configured to tune RAN behavior or performance. For example, the Non-RT MC 1615 may monitor long-term trends and patterns for performance and employ AI/ML models to perform corrective actions through the SMO Framework 1605 (such as reconfiguration via an O1 interface) or via creation of RAN management policies (such as A1 interface policies).

As indicated above, FIG. 16 is provided as an example. Other examples may differ from what is described with regard to FIG. 16.

The following provides an overview of some Aspects of the present disclosure:

Aspect 1: A method of wireless communication performed by a user equipment (UE), comprising: receiving a configuration associated with a plurality of search spaces, wherein the plurality of search spaces are distributed across a plurality of slots; dropping all search spaces of an identified slot based at least in part on one or more overbooking conditions; and monitoring a remainder of the plurality of search spaces other than the dropped search spaces.

Aspect 2: The method of Aspect 1, wherein the configuration is based at least in part on: a first indicator that indicates a minimum gap between an initial slot of a first group of consecutive slots, of the plurality of slots, and an initial slot of a second group of consecutive slots, of the plurality of slots, wherein each slot of the first group of consecutive slots and the second group of consecutive slots is configured with at least one search space, and a second indicator that indicates a maximum number of consecutive slots per group of slots.

Aspect 3: The method of Aspect 2, further comprising determining that all search spaces of a particular slot are not to be dropped based at least in part on the particular slot including at least one common search space.

Aspect 4: The method of Aspect 2, further comprising identifying an error condition based at least in part on a quantity of consecutive slots configured with at least one common search space in the first group of consecutive slots being greater than the maximum number of consecutive slots per group of slots.

Aspect 5: The method of Aspect 2, further comprising determining that a quantity of slots of the first group of consecutive slots is greater than the maximum number of consecutive slots per group of slots, wherein dropping all search spaces of the identified slot is based at least in part on all search spaces of the identified slot being UE-specific search spaces and based at least in part on determining that the quantity of slots of the first group of consecutive slots is greater than the maximum number of consecutive slots per group of slots.

Aspect 6: The method of Aspect 5, wherein monitoring the remainder of the plurality of search spaces comprises monitoring one or more search spaces of all slots, of the plurality of slots, that are configured with at least one common search space.

Aspect 7: The method of Aspect 2, wherein dropping all search spaces of the identified slot comprises dropping all search spaces of one or more initial slots of the first group of consecutive slots.

Aspect 8: The method of Aspect 2, wherein dropping all search spaces of the identified slot comprises dropping all search spaces of one or more last slots of the first group of consecutive slots.

Aspect 9: The method of Aspect 2, wherein dropping all search spaces of the identified slot comprises dropping all search spaces of one or more initial slots of the first group of consecutive slots and one or more last slots of the first group of consecutive slots.

Aspect 10: The method of Aspect 2, wherein dropping all search spaces of the identified slot comprises dropping all search spaces such that the number of consecutive slots configured with a search space is less than or equal to the maximum number of consecutive slots per group of slots.

Aspect 11: The method of Aspect 2, wherein the first group of consecutive slots and the second group of consecutive slots are configured with only one or more UE-specific search spaces, wherein the first group of consecutive slots has a first number of slots and the second group of consecutive slots has a second number of slots.

Aspect 12: The method of Aspect 11, further comprising: dropping, based at least in part on the first number of slots being greater than the second number of slots, the search spaces of the second group of consecutive slots; and monitoring, based at least in part on dropping the search spaces of the second group of consecutive slots, the search spaces of the first group of consecutive slots.

Aspect 13: The method of Aspect 11, further comprising: dropping, based at least in part on the first number of slots being equal to the second number of slots, the search spaces of the first group of consecutive slots or the second group of consecutive slots based at least in part on the one or more overbooking conditions; and monitoring, based at least in part on dropping the search spaces of the first group of consecutive slots or the second group of consecutive slots, the search spaces of the remainder of the first group of consecutive slots or the second group of consecutive slots.

Aspect 14: The method of Aspect 2, wherein the initial slot of the first group of consecutive slots is identified by a first system frame number and the initial slot of the second group of consecutive slots is identified by a second system frame number, wherein a difference between the second system frame number and the first system frame number is at least the minimum gap indicated by the first indicator.

Aspect 15: The method of Aspect 2, further comprising transmitting or receiving capability information that includes the first indicator and the second indicator.

Aspect 16: The method of any of Aspects 1-15, wherein the one or more overbooking conditions are configured to be applied to only a primary cell and not any secondary cells.

Aspect 17: The method of any of Aspects 1-15, wherein the one or more overbooking conditions are configured to be applied to a primary cell and one or more secondary cells.

Aspect 18: The method of any of Aspects 1-17, wherein each search space of the plurality of search spaces indicates a physical downlink control channel monitoring occasion.

Aspect 19: A method of wireless communication performed by a network node, comprising: transmitting a configuration associated with a plurality of search spaces, wherein the plurality of search spaces are distributed across a plurality of slots; dropping all search spaces of an identified slot based at least in part on one or more overbooking conditions; and transmitting on a remainder of the plurality of search spaces other than the dropped search spaces.

Aspect 20: The method of Aspect 19, wherein the configuration is based at least in part on: a first indicator that indicates a minimum gap between an initial slot of a first group of consecutive slots, of the plurality of slots, and an initial slot of a second group of consecutive slots, of the plurality of slots, wherein each slot of the first group of consecutive slots and the second group of consecutive slots is configured with at least one search space, and a second indicator that indicates a maximum number of consecutive slots per group of slots.

Aspect 21: The method of Aspect 20, further comprising determining that all search spaces of a particular slot are not to be dropped based at least in part on the particular slot including at least one common search space.

Aspect 22: The method of Aspect 20, further comprising identifying an error condition based at least in part on a quantity of consecutive slots configured with at least one common search space in the first group of consecutive slots being greater than the maximum number of consecutive slots per group of slots.

Aspect 23: The method of Aspect 20, further comprising determining that a quantity of slots of the first group of consecutive slots is greater than the maximum number of consecutive slots per group of slots, wherein dropping all search spaces of the identified slot is based at least in part on all search spaces of the identified slot being UE-specific search spaces and based at least in part on determining that the quantity of slots of the first group of consecutive slots is greater than the maximum number of consecutive slots per group of slots.

Aspect 24: The method of Aspect 23, wherein transmitting on the remainder of the plurality of search spaces comprises transmitting on one or more search spaces of all slots, of the plurality of slots, that are configured with at least one common search space.

Aspect 25: The method of Aspect 20, wherein dropping all search spaces of the identified slot comprises dropping all search spaces of one or more initial slots of the first group of consecutive slots.

Aspect 26: The method of Aspect 20, wherein dropping all search spaces of the identified slot comprises dropping all search spaces of one or more last slots of the first group of consecutive slots.

Aspect 27: The method of Aspect 20, wherein dropping all search spaces of the identified slot comprises dropping all search spaces of one or more initial slots of the first group of consecutive slots and one or more last slots of the first group of consecutive slots.

Aspect 28: The method of Aspect 20, wherein dropping all search spaces of the identified slot comprises dropping all search spaces such that the number of consecutive slots configured with a search space is less than or equal to the maximum number of consecutive slots per group of slots.

Aspect 29: The method of Aspect 20, wherein the first group of consecutive slots and the second group of consecutive slots are configured with only one or more UE-specific search spaces, wherein the first group of consecutive slots has a first number of slots and the second group of consecutive slots has a second number of slots.

Aspect 30: The method of Aspect 29, further comprising: dropping, based at least in part on the first number of slots being greater than the second number of slots, the search spaces of the second group of consecutive slots; and transmitting on, based at least in part on dropping the search spaces of the second group of consecutive slots, the search spaces of the first group of consecutive slots.

Aspect 31: The method of Aspect 29, further comprising: dropping, based at least in part on the first number of slots being equal to the second number of slots, the search spaces of the first group of consecutive slots or the second group of consecutive slots based at least in part on the one or more overbooking conditions; and transmitting on, based at least in part on dropping the search spaces of the first group of consecutive slots or the second group of consecutive slots, the search spaces of the remainder of the first group of consecutive slots or the second group of consecutive slots.

Aspect 32: The method of Aspect 20, wherein the initial slot of the first group of consecutive slots is identified by a first system frame number and the initial slot of the second group of consecutive slots is identified by a second system frame number, wherein a difference between the second system frame number and the first system frame number is at least the minimum gap indicated by the first indicator.

Aspect 33: The method of Aspect 20, further comprising transmitting or receiving capability information that includes the first indicator and the second indicator.

Aspect 34: The method of any of Aspects 19-33, wherein the one or more overbooking conditions are configured to be applied to only a primary cell and not any secondary cells.

Aspect 35: The method of any of Aspects 19-33, wherein the one or more overbooking conditions are configured to be applied to a primary cell and one or more secondary cells.

Aspect 36: The method of any of Aspects 19-35, wherein each search space of the plurality of search spaces indicates a physical downlink control channel monitoring occasion.

Aspect 37: An apparatus for wireless communication at a device, comprising a processor; memory coupled with the processor; and instructions stored in the memory and executable by the processor to cause the apparatus to perform the method of one or more of Aspects 1-18.

Aspect 38: A device for wireless communication, comprising a memory and one or more processors coupled to the memory, the one or more processors configured to perform the method of one or more of Aspects 1-18.

Aspect 39: An apparatus for wireless communication, comprising at least one means for performing the method of one or more of Aspects 1-18.

Aspect 40: A non-transitory computer-readable medium storing code for wireless communication, the code comprising instructions executable by a processor to perform the method of one or more of Aspects 1-18.

Aspect 41: A non-transitory computer-readable medium storing a set of instructions for wireless communication, the set of instructions comprising one or more instructions that, when executed by one or more processors of a device, cause the device to perform the method of one or more of Aspects 1-18.

Aspect 42: An apparatus for wireless communication at a device, comprising a processor; memory coupled with the processor; and instructions stored in the memory and executable by the processor to cause the apparatus to perform the method of one or more of Aspects 19-36.

Aspect 43: A device for wireless communication, comprising a memory and one or more processors coupled to the memory, the one or more processors configured to perform the method of one or more of Aspects 19-36.

Aspect 44: An apparatus for wireless communication, comprising at least one means for performing the method of one or more of Aspects 19-36.

Aspect 45: A non-transitory computer-readable medium storing code for wireless communication, the code comprising instructions executable by a processor to perform the method of one or more of Aspects 19-36.

Aspect 46: A non-transitory computer-readable medium storing a set of instructions for wireless communication, the set of instructions comprising one or more instructions that, when executed by one or more processors of a device, cause the device to perform the method of one or more of Aspects 19-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   memory; and
   one or more processors, coupled to the memory, individually or collectively configured to cause the UE to:
      receive a configuration associated with a plurality of search spaces, wherein the plurality of search spaces are distributed across a plurality of slots, wherein the configuration is based at least in part on:
         a first indicator that indicates a minimum gap between an initial slot of a first group of consecutive slots, of the plurality of slots, and an initial slot of a second group of consecutive slots, of the plurality of slots, wherein each slot of the first group of consecutive slots and the second group of consecutive slots is configured with at least one search space, and
         a second indicator that indicates a maximum number of consecutive slots per group of slots;
      drop all search spaces in an identified slot, based at least in part on one or more overbooking conditions, to remove an overbooking associated with a group of consecutive slots, wherein the one or more overbooking conditions indicate that the UE is to refrain from dropping any search spaces in a slot that is configured with a common search space and that the UE is to drop all the search spaces of one or more slots that are configured only with UE-specific search spaces to remove the overbooking associated with the group of consecutive slots;
      identifying an error condition based at least in part on a quantity of consecutive slots configured with at least one common search space in the first group of consecutive slots being greater than the maximum number of consecutive slots per group of slots; and monitor a remainder of the plurality of search spaces other than the dropped search spaces.

2. The apparatus of claim 1, wherein the one or more processors are individually or collectively configured to cause the UE to determine that a quantity of slots of the first group of consecutive slots is greater than the maximum number of consecutive slots per group of slots, wherein dropping all search spaces of the identified slot is based at least in part on all search spaces of the identified slot being UE-specific search spaces and based at least in part on determining that the quantity of slots of the first group of consecutive slots is greater than the maximum number of consecutive slots per group of slots.

3. The apparatus of claim 2, wherein the one or more processors, to monitor the remainder of the plurality of search spaces, are individually or collectively configured to cause the UE to monitor one or more search spaces of all slots, of the plurality of slots, that are configured with at least one common search space.

4. The apparatus of claim 1, wherein the one or more processors, to drop all search spaces of the identified slot, are individually or collectively configured to cause the UE to:
drop all search spaces of one or more initial slots of the first group of consecutive slots;
drop all search spaces of one or more last slots of the first group of consecutive slots;
drop all search spaces of one or more initial slots of the first group of consecutive slots and one or more last slots of the first group of consecutive slots; or
drop all search spaces such that a number of consecutive slots configured with a search space is less than or equal to the maximum number of consecutive slots per group of slots.

5. The apparatus of claim 1, wherein the first group of consecutive slots and the second group of consecutive slots are configured with only one or more UE-specific search spaces, wherein the first group of consecutive slots has a first number of slots and the second group of consecutive slots has a second number of slots.

6. The apparatus of claim 5, wherein the one or more processors are individually or collectively configured to cause the UE to:
drop, based at least in part on the first number of slots being greater than the second number of slots, the one or more UE-specific search spaces of the second group of consecutive slots; and
monitor, based at least in part on dropping the one or more UE-specific search spaces of the second group of consecutive slots, the one or more UE-specific search spaces of the first group of consecutive slots.

7. The apparatus of claim 5, wherein the one or more processors are individually or collectively configured to cause the UE to:
drop, based at least in part on the first number of slots being equal to the second number of slots, the one or more UE-specific search spaces of the first group of consecutive slots or the second group of consecutive slots based at least in part on the one or more overbooking conditions; and
monitor, based at least in part on dropping the one or more UE-specific search spaces of the first group of consecutive slots or the second group of consecutive slots, the one or more UE-specific search spaces of the remainder of the first group of consecutive slots or the second group of consecutive slots.

8. The apparatus of claim 1, wherein the initial slot of the first group of consecutive slots is identified by a first system frame number and the initial slot of the second group of consecutive slots is identified by a second system frame number, wherein a difference between the second system frame number and the first system frame number is at least the minimum gap indicated by the first indicator.

9. The apparatus of claim 1, wherein the one or more processors are individually or collectively configured to cause the UE to transmit or receive capability information that includes the first indicator and the second indicator.

10. The apparatus of claim 1, wherein the one or more overbooking conditions are configured to be applied to only a primary cell and not any secondary cells.

11. The apparatus of claim 1, wherein the one or more overbooking conditions are configured to be applied to a primary cell and one or more secondary cells.

12. The apparatus of claim 1, wherein each search space of the plurality of search spaces indicates a physical downlink control channel monitoring occasion.

13. An apparatus for wireless communication at a network node, comprising:
a memory; and
one or more processors, coupled to the memory, configured to:
transmit a configuration associated with a plurality of search spaces, wherein the plurality of search spaces are distributed across a plurality of slots, wherein the configuration is based at least in part on:
a first indicator that indicates a minimum gap between an initial slot of a first group of consecutive slots, of the plurality of slots, and an initial slot of a second group of consecutive slots, of the plurality of slots, wherein each slot of the first group of consecutive slots and the second group of consecutive slots is configured with at least one search space, and
a second indicator that indicates a maximum number of consecutive slots per group of slots;
drop all search spaces in an identified slot, based at least in part on one or more overbooking conditions, to remove an overbooking associated with a group of consecutive slots, wherein the one or more overbooking conditions indicate that the network node is to refrain from dropping any search spaces in a slot that is configured with a common search space and that the network node is to drop all the search spaces of one or more slots that are configured only with UE-specific search spaces to remove the overbooking associated with the group of consecutive slots; and
transmit on a remainder of the plurality of search spaces other than the dropped search spaces, wherein an error condition is identified based at least in part on a quantity of consecutive slots configured with at least one common search space in the first group of consecutive slots being greater than the maximum number of consecutive slots per group of slots.

14. The apparatus of claim 13, wherein the one or more processors are individually or collectively configured to cause the network node to determine that a quantity of slots of the first group of consecutive slots is greater than the maximum number of consecutive slots per group of slots, wherein dropping all search spaces of the identified slot is based at least in part on all search spaces of the identified slot being UE-specific search spaces and based at least in part on determining that the quantity of slots of the first group of consecutive slots is greater than the maximum number of consecutive slots per group of slots.

15. The apparatus of claim 14, wherein the one or more processors, to transmit on the remainder of the plurality of search spaces, are individually or collectively configured to cause the network node to transmit on one or more search spaces of all slots, of the plurality of slots, that are configured with at least one common search space.

16. The apparatus of claim 13, wherein the one or more processors, to drop all search spaces of the identified slot, are individually or collectively configured to cause the network node to:
drop all search spaces of one or more initial slots of the first group of consecutive slots;
drop all search spaces of one or more last slots of the first group of consecutive slots;
drop all search spaces of one or more initial slots of the first group of consecutive slots and one or more last slots of the first group of consecutive slots; or
drop all search spaces such that a number of consecutive slots configured with a search space is less than or equal to the maximum number of consecutive slots per group of slots.

17. The apparatus of claim 13, wherein the first group of consecutive slots and the second group of consecutive slots are configured with only one or more UE-specific search spaces, wherein the first group of consecutive slots has a first number of slots and the second group of consecutive slots has a second number of slots.

18. The apparatus of claim 17, wherein the one or more processors are individually or collectively configured to cause the network node to:
drop, based at least in part on the first number of slots being greater than the second number of slots, the one or more UE-specific search spaces of the second group of consecutive slots; and
transmit on, based at least in part on dropping the one or more UE-specific search spaces of the second group of consecutive slots, the one or more UE-specific search spaces of the first group of consecutive slots.

19. The apparatus of claim 17, wherein the one or more processors are individually or collectively configured to cause the network node to:
drop, based at least in part on the first number of slots being equal to the second number of slots, the one or more UE-specific search spaces of the first group of consecutive slots or the second group of consecutive slots based at least in part on the one or more overbooking conditions; and
transmit on, based at least in part on dropping the one or more UE-specific search spaces of the first group of consecutive slots or the second group of consecutive slots, the one or more UE-specific search spaces of the remainder of the first group of consecutive slots or the second group of consecutive slots.

20. The apparatus of claim 13, wherein the initial slot of the first group of consecutive slots is identified by a first system frame number and the initial slot of the second group of consecutive slots is identified by a second system frame number, wherein a difference between the second system frame number and the first system frame number is at least the minimum gap indicated by the first indicator.

21. A method of wireless communication performed by a user equipment (UE), comprising:
receiving a configuration associated with a plurality of search spaces, wherein the plurality of search spaces are distributed across a plurality of slots, wherein the configuration is determined based at least in part on:
a first indicator that indicates a minimum gap between an initial slot of a first group of consecutive slots, of the plurality of slots, and an initial slot of a second group of consecutive slots, of the plurality of slots, wherein each slot of the first group of consecutive slots and the second group of consecutive slots is configured with at least one search space, and
a second indicator that indicates a maximum number of consecutive slots per group of slots;
dropping all search spaces in an identified slot, based at least in part on one or more overbooking conditions, to remove an overbooking associated with a group of consecutive slots, wherein the one or more overbooking conditions indicate that the UE is to refrain from dropping any search spaces in a slot that is configured with a common search space and that the UE is to drop all the search spaces of one or more slots that are configured only with UE-specific search spaces to remove the overbooking associated with the group of consecutive slots;
identifying an error condition based at least in part on a quantity of consecutive slots configured with at least one common search space in the first group of consecutive slots being greater than the maximum number of consecutive slots per group of slots; and
monitoring a remainder of the plurality of search spaces other than the dropped search spaces.

22. The method of claim 21, further comprising:
determining that a quantity of slots of the first group of consecutive slots is greater than the maximum number of consecutive slots per group of slots, wherein dropping all search spaces of the identified slot is based at least in part on all search spaces of the identified slot being UE-specific search spaces and based at least in part on determining that the quantity of slots of the first group of consecutive slots is greater than the maximum number of consecutive slots per group of slots.

23. The method of claim 22, wherein dropping all search spaces of the identified slot comprises:
dropping all search spaces of one or more initial slots of the first group of consecutive slots;
dropping all search spaces of one or more last slots of the first group of consecutive slots;
dropping all search spaces of one or more initial slots of the first group of consecutive slots and one or more last slots of the first group of consecutive slots; or
dropping all search spaces such that a number of consecutive slots configured with a search space is less than or equal to the maximum number of consecutive slots per group of slots.

24. The method of claim 21, wherein the first group of consecutive slots and the second group of consecutive slots are configured with only one or more UE-specific search spaces, wherein the first group of consecutive slots has a first number of slots and the second group of consecutive slots has a second number of slots.

25. The method of claim 24, further comprising:
dropping, based at least in part on the first number of slots being greater than the second number of slots, the one or more UE-specific search spaces of the second group of consecutive slots; and
monitoring, based at least in part on dropping the one or more UE-specific search spaces of the second group of consecutive slots, the one or more UE-specific search spaces of the first group of consecutive slots.

26. The method of claim 24, further comprising:
dropping, based at least in part on the first number of slots being equal to the second number of slots, the one or more UE-specific search spaces of the first group of consecutive slots or the second group of consecutive slots based at least in part on the one or more overbooking conditions; and
monitoring, based at least in part on dropping the one or more UE-specific search spaces of the first group of consecutive slots or the second group of consecutive slots, the one or more UE-specific search spaces of the remainder of the first group of consecutive slots or the second group of consecutive slots.

27. The method of claim 21, wherein the initial slot of the first group of consecutive slots is identified by a first system frame number and the initial slot of the second group of consecutive slots is identified by a second system frame number, wherein a difference between the second system frame number and the first system frame number is at least the minimum gap indicated by the first indicator.

28. The method of claim 21, wherein the one or more processors are individually or collectively configured to cause the UE to transmit or receive capability information that includes the first indicator and the second indicator.

29. The method of claim 21, wherein the one or more overbooking conditions are configured to be applied to only a primary cell and not any secondary cells.

30. A method of wireless communication performed by a network node, comprising:
transmitting a configuration associated with a plurality of search spaces, wherein the plurality of search spaces are distributed across a plurality of slots, wherein the configuration is determined based at least in part on:
a first indicator that indicates a minimum gap between an initial slot of a first group of consecutive slots, of the plurality of slots, and an initial slot of a second group of consecutive slots, of the plurality of slots, wherein each slot of the first group of consecutive slots and the second group of consecutive slots is configured with at least one search space, and
a second indicator that indicates a maximum number of consecutive slots per group of slots;
dropping all search spaces in an identified slot, based at least in part on one or more overbooking conditions, to remove an overbooking associated with a group of consecutive slots, wherein the one or more overbooking conditions indicate that the network node is to refrain from dropping any search spaces in a slot that is configured with a common search space and that the network node is to drop all the search spaces of one or more slots that are configured only with UE-specific search spaces to remove the overbooking associated with the group of consecutive slots; and
transmitting on a remainder of the plurality of search spaces other than the dropped search spaces, wherein an error condition is identified based at least in part on a quantity of consecutive slots configured with at least one common search space in the first group of consecutive slots being greater than the maximum number of consecutive slots per group of slots.

* * * * *